United States Patent
Ookuma et al.

(10) Patent No.: US 9,317,187 B2
(45) Date of Patent: Apr. 19, 2016

(54) WEB BROWSER OPERATION METHOD AND OPERATION APPARATUS

(71) Applicant: CANON KABUSHIKI KAISHA, Tokyo (JP)

(72) Inventors: Satoshi Ookuma, Yokohama (JP); Hirohiko Tashiro, Kawasaki (JP); Kaori Nishiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 446 days.

(21) Appl. No.: 13/760,185

(22) Filed: Feb. 6, 2013

(65) Prior Publication Data
US 2013/0151998 A1    Jun. 13, 2013

Related U.S. Application Data

(63) Continuation of application No. 11/292,236, filed on Dec. 1, 2005, now Pat. No. 8,396,942.

(30) Foreign Application Priority Data

Dec. 1, 2004   (JP) .................................. 2004-348971

(51) Int. Cl.
  *G06F 15/16*   (2006.01)
  *G06F 3/0484*   (2013.01)
  (Continued)

(52) U.S. Cl.
  CPC .............. *G06F 3/0484* (2013.01); *G06F 21/31* (2013.01); *G06F 21/62* (2013.01); *G06F 2221/2149* (2013.01)

(58) Field of Classification Search
  USPC ........................... 709/219, 203, 220, 222, 223
  See application file for complete search history.

(56) References Cited

U.S. PATENT DOCUMENTS 6,211,871 B1 *  4/2001  Himmel et al. ............... 715/744
7,379,199 B2    5/2008  Hisatomi et al.
(Continued)

FOREIGN PATENT DOCUMENTS

CN       1485746       3/2004
JP    10-065853 A      3/1998
(Continued)

OTHER PUBLICATIONS

Japanese Office Action cited in Japanese counterpart application No. JP2010-259502, dated Jul. 16, 2013. English translation provided.

(Continued)

*Primary Examiner* — Lan-Dai T Truong
(74) *Attorney, Agent, or Firm* — Rossi, Kimms & McDowell LLP

(57) ABSTRACT

There is provided a web browser operation method and operation apparatus capable of preferably setting an access restriction function for restricting access of a web browser to be used by an unspecified number of users. First, content acquired from a web server is displayed on a display based on a format described in the content. An operation tool for performing operations related to processing of the content is also displayed on the screen. When an operation instruction is inputted by a user with the use of the operation tool, processing related to the displayed content is performed based on the operation instruction. In this case, restrictions are set on operation instructions by the user among operation instructions, and selection by the user of tool portions corresponding to the set restrictions, among tool portions which can be specified by the operation tool, are set as disabled.

16 Claims, 21 Drawing Sheets

(51) Int. Cl.
  *G06F 21/31*  (2013.01)
  *G06F 21/62*  (2013.01)

(56) References Cited

U.S. PATENT DOCUMENTS

| | | | |
|---|---|---|---|
| 7,607,131 B2 | 10/2009 | Oe et al. | |
| 2001/0011285 A1 | 8/2001 | Kanno et al. | |
| 2003/0115292 A1 | 6/2003 | Griffin et al. | |
| 2004/0030781 A1* | 2/2004 | Etesse et al. | 709/225 |
| 2004/0190036 A1 | 9/2004 | Shibao | |
| 2005/0198063 A1 | 9/2005 | Thomas et al. | |
| 2006/0136576 A1 | 6/2006 | Ookuma et al. | |
| 2007/0288861 A1 | 12/2007 | Tabellion et al. | |
| 2008/0066164 A1 | 3/2008 | Chebolu et al. | |
| 2008/0148193 A1 | 6/2008 | Moetteli | |
| 2008/0172601 A1 | 7/2008 | Dettinger et al. | |
| 2008/0201663 A1* | 8/2008 | Etgen | 715/833 |
| 2008/0270535 A1 | 10/2008 | Adema et al. | |
| 2009/0077172 A1 | 3/2009 | Yamamoto | |
| 2009/0317786 A1 | 12/2009 | Alcorn et al. | |
| 2010/0208302 A1 | 8/2010 | Lee | |

FOREIGN PATENT DOCUMENTS

| | | |
|---|---|---|
| JP | 2003-044297 A | 2/2003 |
| JP | 2003-076805 A | 3/2003 |
| JP | 2004-295180 A | 10/2004 |
| WO | 9917229 A | 4/1999 |
| WO | 03/084222 A1 | 10/2003 |
| WO | 2004/061581 A2 | 7/2004 |

OTHER PUBLICATIONS

InfoBarrier3, Windows Server World, Japan, IDG Japan, Inc. Jun. 1, 2004, vol. 9, No. 6, p. 219. Cited in JPOA issued in counterpart application No. JP2010-259502, dated Apr. 22, 2013. English translation provided.

Japanese Office Action cited in Japanese counterpart application No. JP2010-259502, dated Apr. 22, 2013. English translation provided.

Japanese Office Action for JP 2004-348971, mail date May 28, 2011. Cited in parent U.S. Appl. No. 11/292,236.

Chinese Office Action for CN 2005101258810, mail date Nov. 16, 2007. Cited in parent U.S. Appl. No. 11/292,236.

Appeal/Trial Decision for JP 2004-348,971, dated Dec. 19, 2011. Cited in parent U.S. Appl. No. 11/292,236.

Notifying Result of Reconsideration by Examiner before Appeal issued in JP 2004-348971, dated Jan. 6, 2011.

"Notes/Domino 6—Full Verification of Remarkable Functions", Notes/Domino Magazine; No. 69; Japan; SOFTBANK Publishing Inc.; Jun. 18, 2002; vol. 69, pp. 55-57. Cited in parent U.S. Appl. No. 11/292,236. English translation provided.

Japanese Office Action for JP 2004-348971, mail Aug. 20, 2010. Cited in parent U.S. Appl. No. 11/292,236.

"InfoBarrier Version 2", Windows 2000 World vol. 6, No. 7, Japan, IDG Japan, Inc., May 29, 2001, p. 185. Cited in parent U.S. Appl. No. 11/292,236. English translation provided.

"Software Review for Enterprise Servers", Enterprise Servers World, vol. 4, No. 3, Japan, IDG Japan Inc., Jan. 26, 2001, pp. 118-121. Cited in parent U.S. Appl. No. 11/292,236. English translation provided.

* cited by examiner

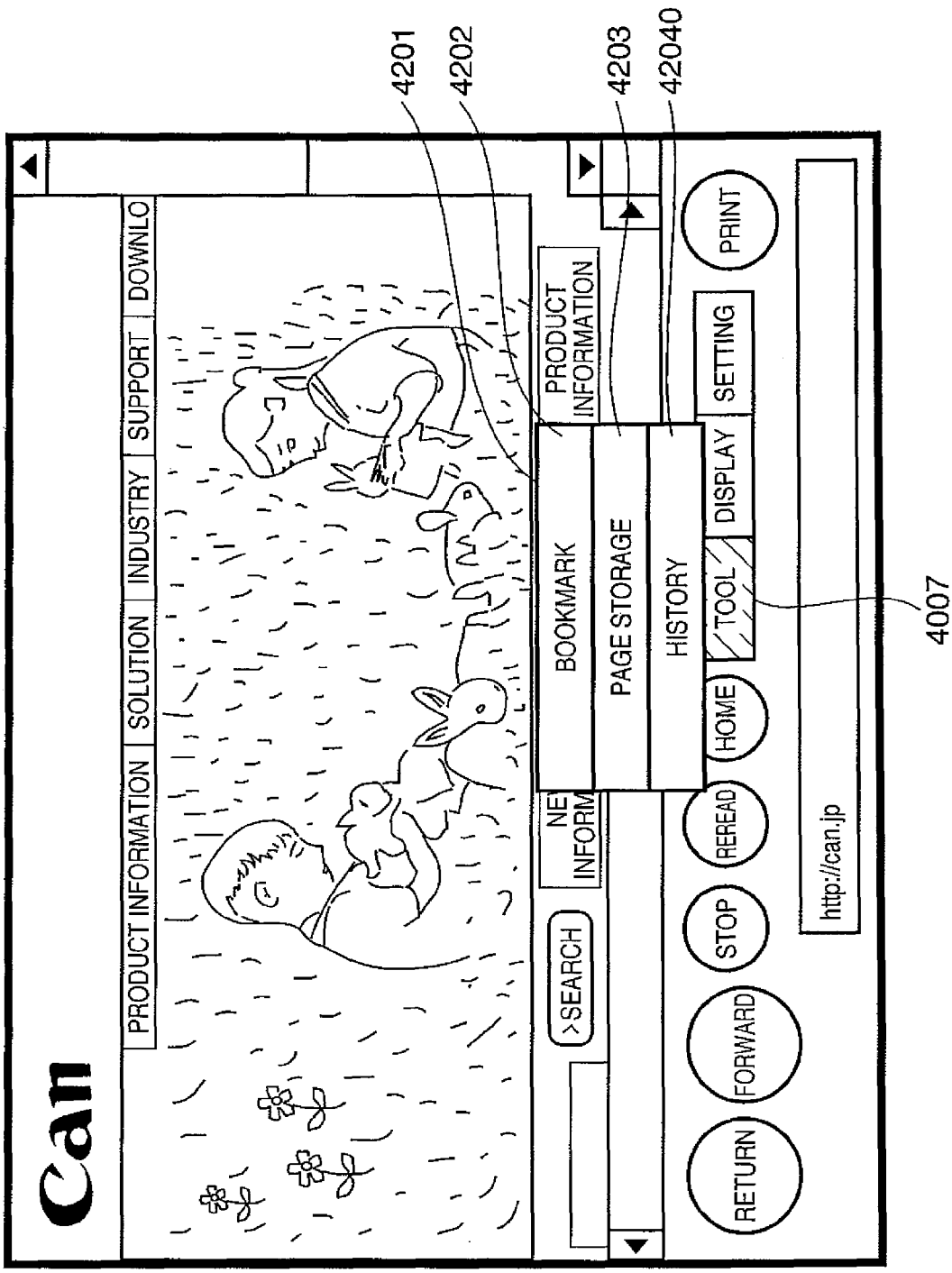

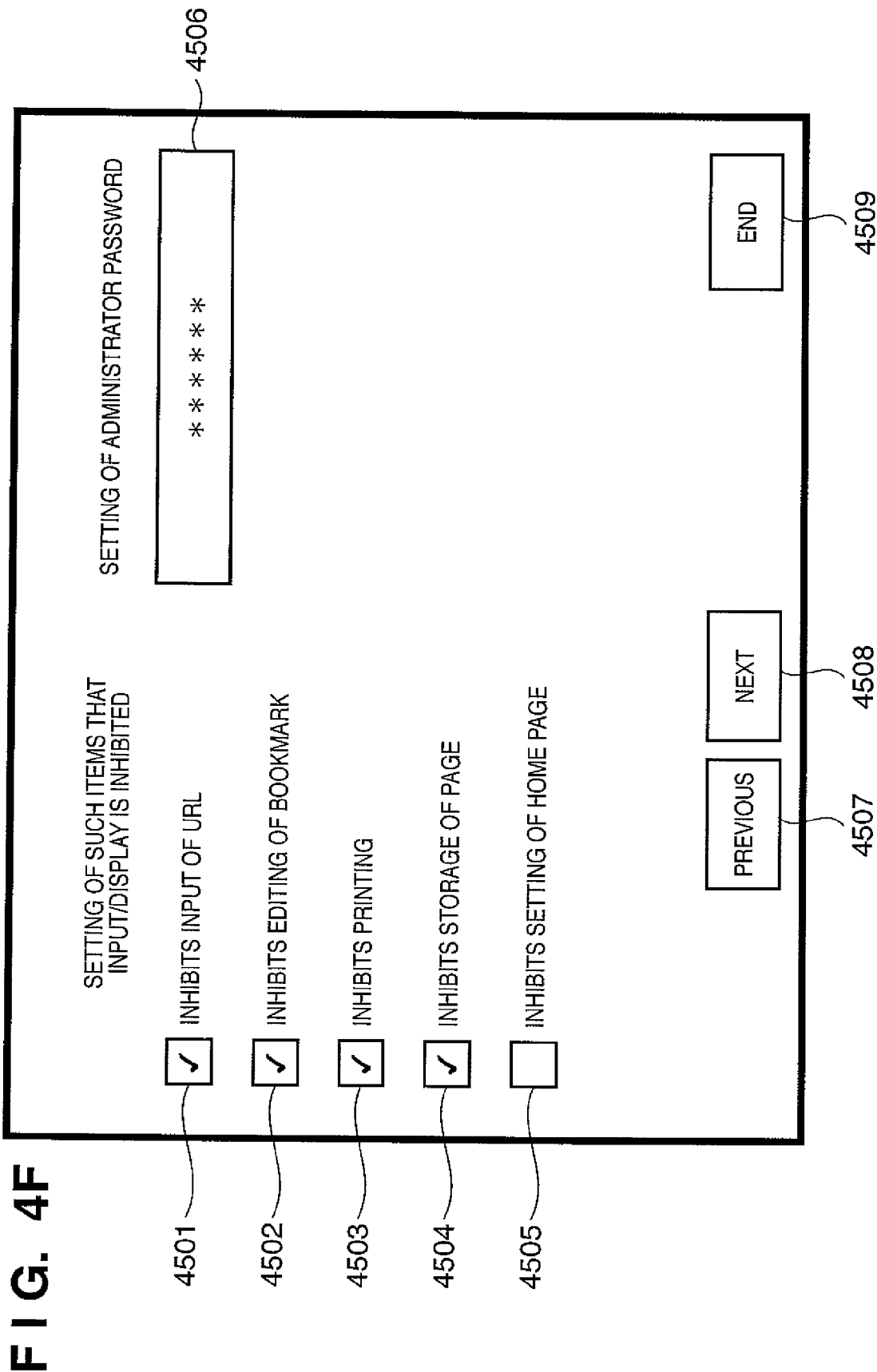

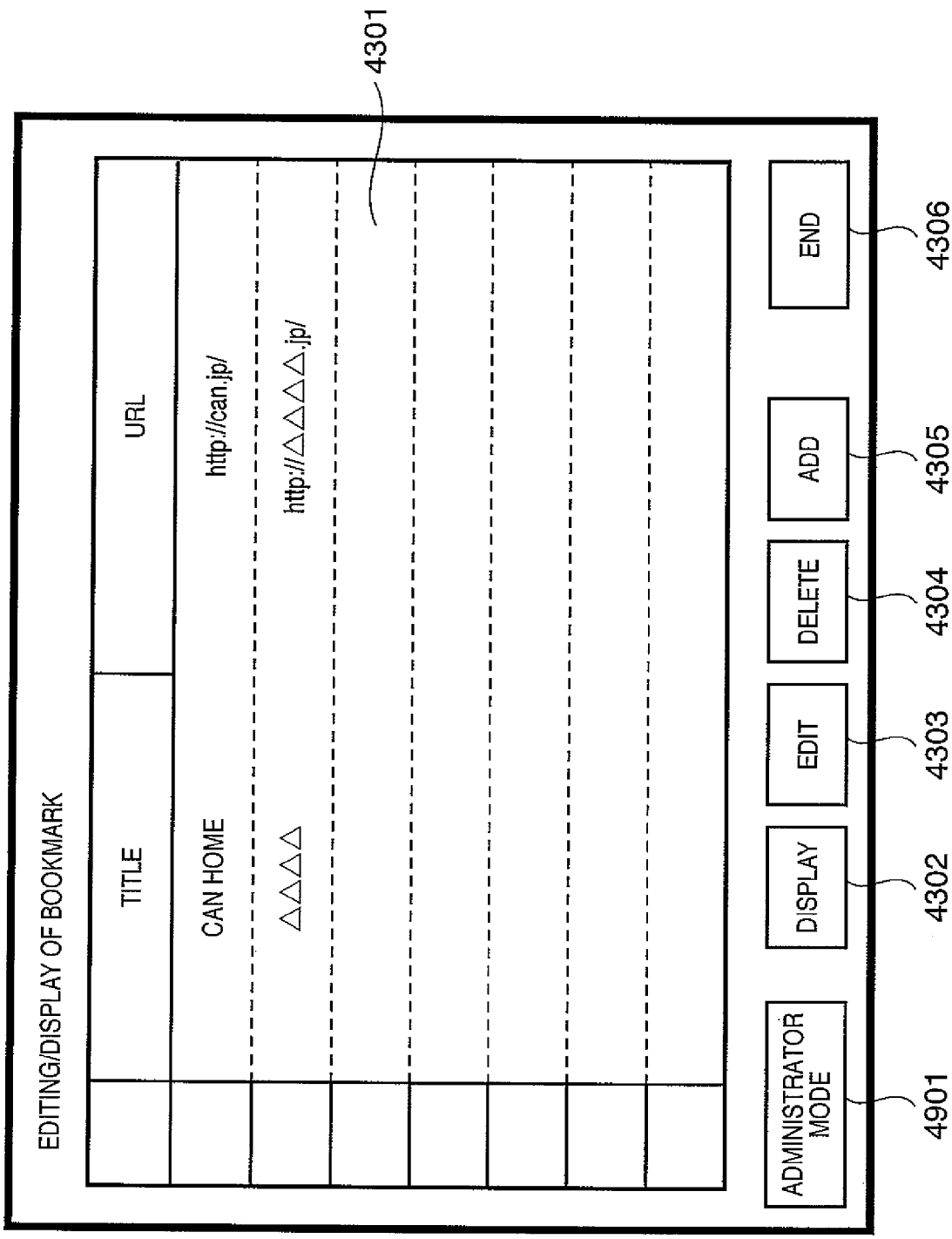

WEB BROWSER OPERATION METHOD AND OPERATION APPARATUS

This application is a continuation of prior U.S. patent application Ser. No. 11/292,236, filed Dec. 1, 2005, the entire disclosure of which is hereby incorporated herein by reference.

FIELD OF THE INVENTION

The present invention relates to a web browser operation method and operation apparatus for restricting functions such as a content display operation in a web browser.

BACKGROUND OF THE INVENTION

Now, a web browser is mounted on various equipment, including a personal computer (PC). The web browser can acquire content described in HTML, XML or the like from a web server and display the acquired content in layout based on the format described in the content.

Access to content on a web server is enabled by URL addressing, in which a URL address is specified by directly inputting a URL address with the use of a keyboard or the like, or by registering a URL address as a bookmark in advance and specifying the bookmark.

In addition, the web browser also has functions of storing content on a server in a local storage device and printing out content by means of a printing apparatus.

Such a web browser is not only used on a PC, PDA or the like used by a particular person but also used by an unspecified number of users, on a PC shared by a lot of users, an information terminal installed in a public facility, a copying machine or a printer installed in an office and the like (see Japanese Patent Laid-Open No. 10-65853, for example).

In this case, access to pages which can be browsed by a web browser may be restricted for the purpose of inhibiting access to content other than content considered to be required for work, enhancing security, enabling browsing only via an intranet, inhibiting access to paid content, and the like.

Commonly, as a method for page access restrictions, equipment on a network path, such as a proxy and a gateway, may be used to restrict access, or the user management function of the OS on which a web browser is operating is used to place access restrictions.

However, if a page access restriction method as described above is used, setting of the equipment such as a proxy and a gateway is complicated, and all pieces of equipment connecting to a network via the equipment are influenced.

Furthermore, in the case of the access restriction method utilizing the user management function of the OS of a general-purpose PC, a user is required to perform user switching at the OS level every time he uses the PC. In the case of using software-embedded equipment, such as a household electrical appliance and a copying machine, it is impossible to perform such an operation.

SUMMARY OF THE INVENTION

The present invention has been made in consideration of the above situation, and its object is to provide a web browser operation method and operation apparatus capable of preferably setting an access restriction function of restricting access of a web browser to used by an unspecified number of users.

In order to solve the above problems, a web browser operation method of the present invention is a web browser operation method comprising a content display step of displaying content acquired from a web server on a predetermined screen based on a format described in the content, a tool display step of displaying an operation tool for performing operation related to processing of the content on the screen, an input step of inputting an operation instruction by a user with the use of the operation tool, and a processing step of performing processing related to the content displayed on the screen based on the operation instruction, the method further comprising: a first setting step of setting restrictions on operation instructions by the user; and a second setting step of setting selection by the user of tool portions corresponding to the restrictions set by the first setting step, among tool portions to be specified by the operation tool, as disabled.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4C shows an example of a screen to be displayed when a tool key 4007 is pressed on the screen shown in FIG. 4A;

FIG. 4F shows an example of a screen to be displayed when a password inputted on the screen shown in FIG. 4E is determined to be corresponding to an administrator password;

FIG. 4I shows an example of a screen to be displayed when a password inputted on the screen shown in FIG. 4E is determined to be corresponding to an administrator password;

FIG. 4J shows another example of a screen to be displayed when a password inputted on the screen shown in FIG. 4E is determined to be corresponding to an administrator password;

DETAILED DESCRIPTION OF THE PREFERRED EMBODIMENTS

Figure 1:
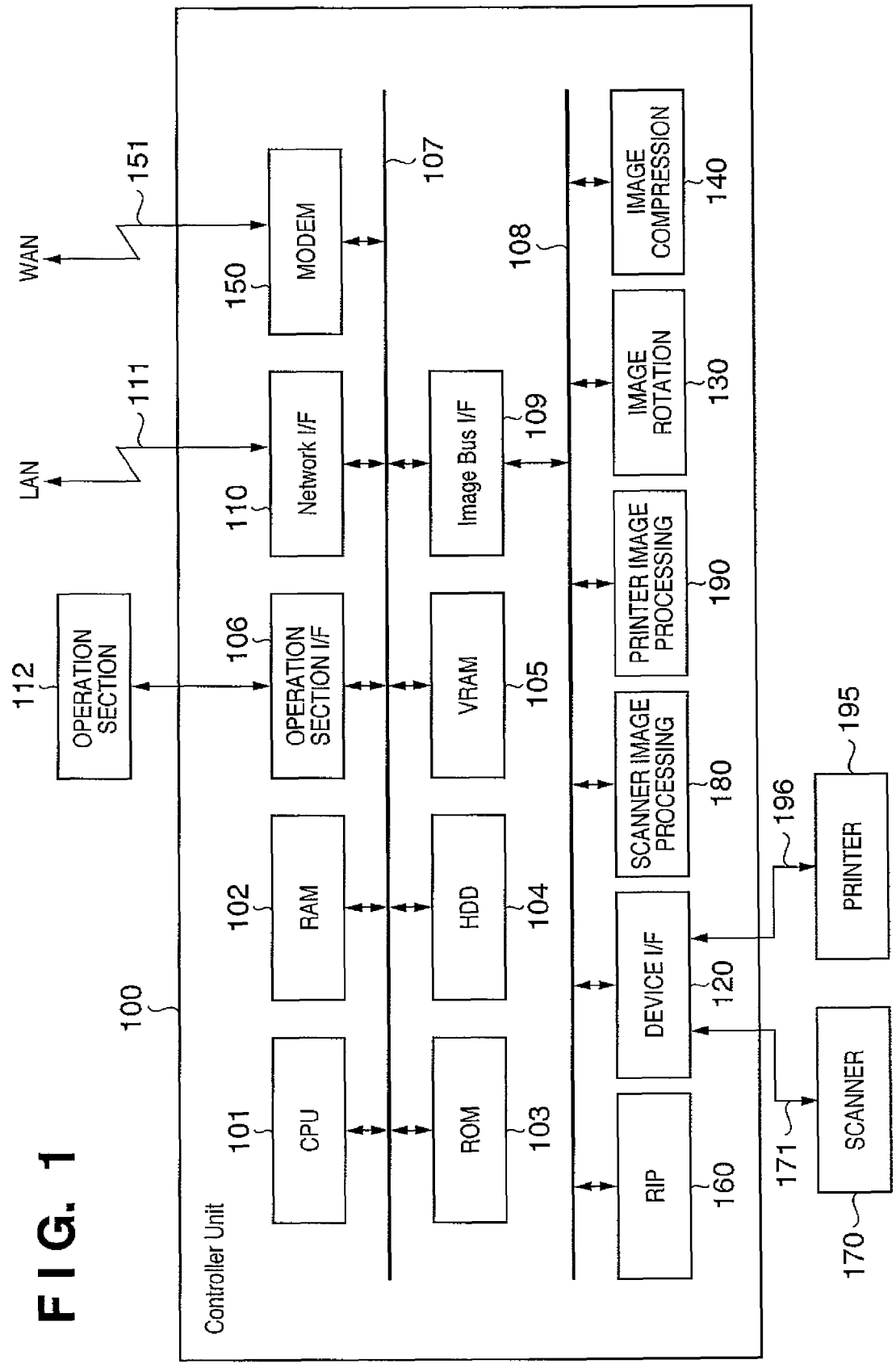
FIG. 1 is a block diagram showing configuration of an image processing apparatus according to an embodiment of the present invention.

FIG. 1 is a block diagram showing configuration of an image processing apparatus according to an embodiment of the present invention. In FIG. 1, a controller unit 100 is connected to a scanner 170 which is an image input device and a printer 195 which is an image output device. Meanwhile, it is connected to a LAN 111 or a public line (WAN) 151 to input/output image information or device information.

In the controller unit 100, a CPU 101 is a controller for controlling the entire system. A RAM 102 is a system work memory where the CPU 101 operates, and it is also an image memory where image data is to be temporarily stored. A ROM 103 is a boot ROM, in which a boot program of the system is stored. Furthermore, an HDD 104 is a hard disk drive, in which system software, image data and the like are to be stored. A real-time OS which is to be embedded in equipment is incorporated in the controller unit 100, and the system is controlled by the OS. This OS does not have a user management function.

A VRAM 105 is a memory in which an operation section display image is stored, which is generated by the CPU 101 and is to be displayed on an operation section 112. An operation section I/F 106 is an interface section to the operation section (UI) 112 and outputs image data to be displayed on the operation section 112, which is stored in the VRAM 105, to the operation section 112. The operation section I/F 106 plays a role of communicating information inputted from the operation section 112 by a user of this system, to the CPU 101.

A network interface (Network I/F) 110 connects to the LAN 111 to input/output information. A modem 150 connects to the public line (WAN) 151 to input/output information.

The network interface 110 and the modem 150 are used to access the LAN 111, the public line (WAN) 151, a web server or the like to input information such as web content or request web content from a web server or the like.

The devices described above are arranged on a system bus 107.

An image bus I/F 109 is a bus bridge for connecting the system bus 107 and an image bus 108 which transfers image data at a high speed to convert a data structure.

The image bus 108 is configured by a PCI bus or an IEEE 1394 bus. The following devices are arranged on the image bus 108.

A raster image processor (RIP) 160 develops a PDL code into a bitmap image. A device I/F section 120 connects the scanner 170 or the printer 195, which is an image input/putout device, to the controller unit 100 to perform synchronous/asynchronous conversion.

A scanner image processing section 180 performs image processing, such as correction, processing and editing, for inputted image data. A printer image processing section 190 performs image processing, such as correction of a printer and resolution conversion, for image data to be printed out.

An image rotation section 130 rotates image data. An image compression section 140 performs JPEG compression/expansion processing for multi-valued image data and JBIG, MMR or MH compression/expansion processing for binary image data.

The above devices are configured in an embedded form.

Figure 2:
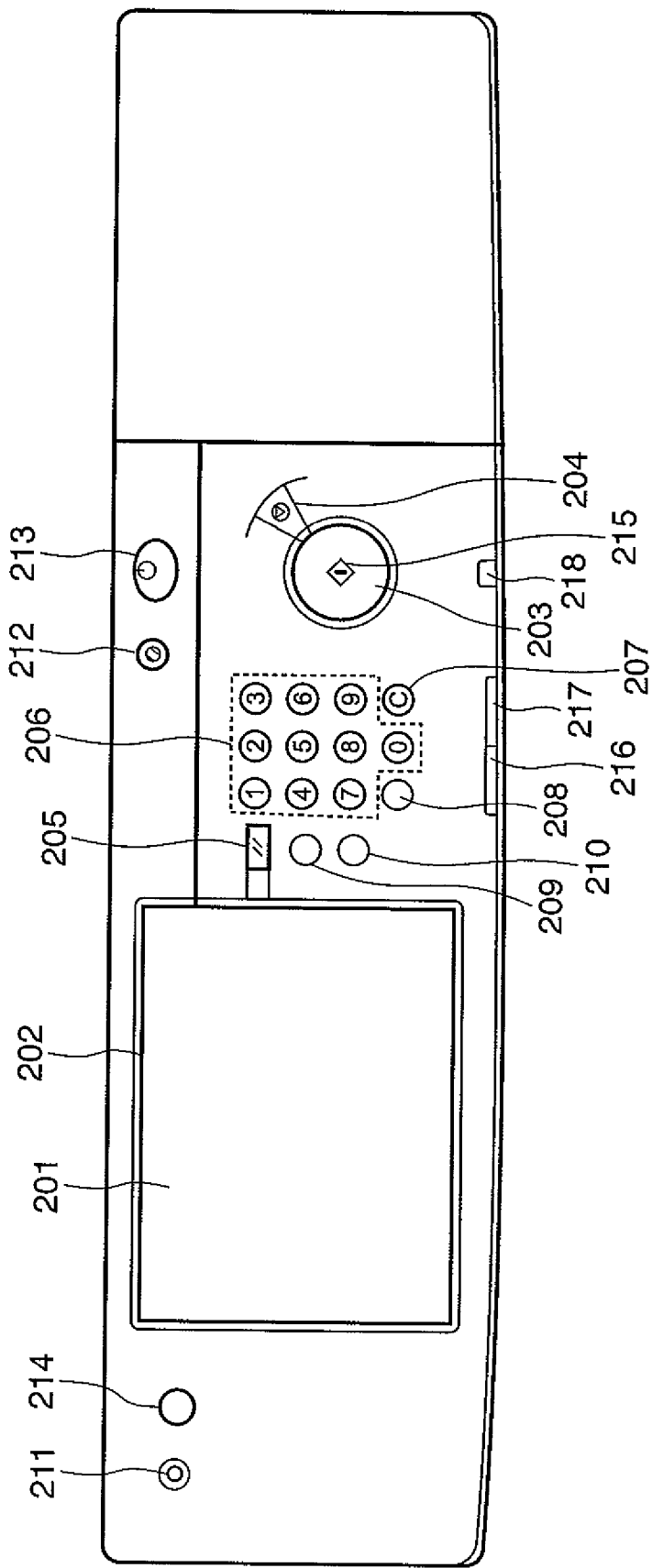
FIG. 2 is an external view of an operation section 112 of the image processing apparatus according to the embodiment of the present invention.

FIG. 2 is an external view of the operation section 112 of the image processing apparatus according to the embodiment of the present invention. An LCD display section 202 is an LCD on which a touch panel sheet 201 is stuck. A system operation screen and softkeys are displayed on the LCD display section 202, and when a displayed portion of a displayed key is pressed, location information about that is communicated to the CPU 101 which is a controller.

A start key 203 is used to start operation of reading an original image. At the center of the start key 203, there is an LED 215 which can be displayed in two colors of green and red. The colors indicate whether the start key 203 is effective or not.

A stop key 204 performs a function of stopping operation being performed. A reset key 205 is used to initialize the settings for the operation section 112. A ten key group 206 is used to input a numeric value. A clear key 207 is used to clear an inputted numeric value.

An ID key 208 is used to input a user ID of a user. The ID key 208 is also used as a key for an administrator of this apparatus (system) to switch to an administrator mode in which he is specially authorized to make various setting for the apparatus. The ID key 208 is also used as a key for exiting the administrator mode when the state is the administrator mode. Transition to the administrator mode will be described later in detail.

A guide key 209 is used to display a help screen, which is an auxiliary screen for explaining setting and input methods. A user mode key 210 is used to make special settings or detailed settings related to operation of the apparatus. A counter key 211 is used to confirm the number of sheets of paper printed by the apparatus. A power saving key 212 is used to switch the apparatus to a standby state to suppress power consumption. A power supply key 213 is used to turn on or off the power supply of the apparatus. Tally lamps 216 and 217 flicker or light up when the apparatus is in operation and when some abnormality has occurred in the apparatus, respectively. A power supply lamp 218 lights up when the power supply for the apparatus is turned on by the power supply key 213.

Figure 3:
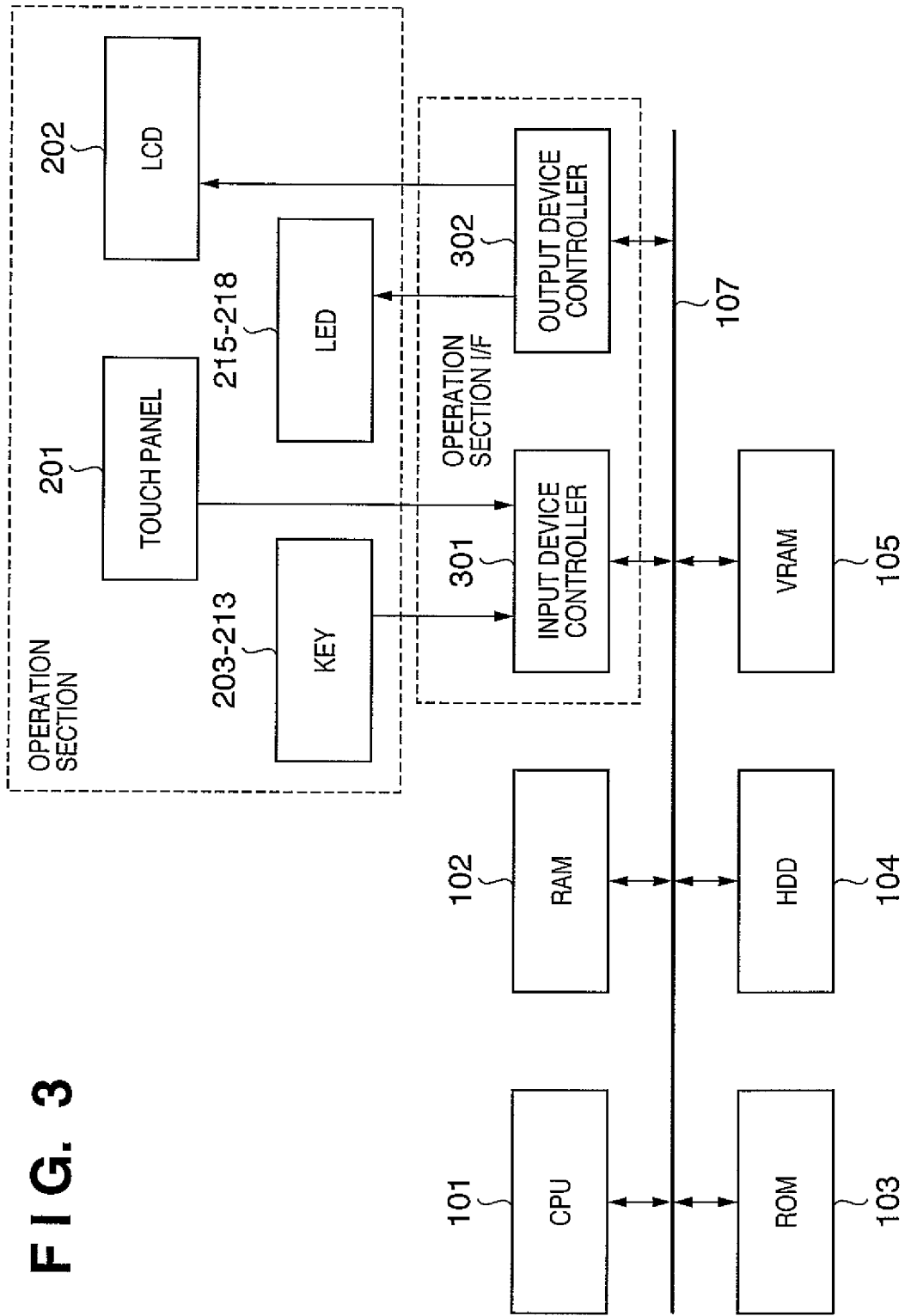
FIG. 3 is a block diagram for illustrating detailed configuration of the operation section 112 of the image processing apparatus according to the embodiment of the present invention.

FIG. 3 is a block diagram for illustrating detailed configuration of the operation section 112 of the image processing apparatus according to the embodiment of the present invention. As shown in FIG. 3, in the image processing apparatus according to this embodiment, the CPU 101 performs overall control of access to various devices connected to the system bus 107 based on a control programs and the like stored in the ROM 103 for programs, reads inputted information from the scanner 170 connected via an image input section interface 171, and outputs an image signal as output information to the printer 195 connected via a printer interface 196.

In the ROM 103 for programs, there are stored control programs for performing processings shown by flowcharts in FIG. 5A to FIG. 6D to be described later. The RAM 102 functions as a main memory, a work area and the like for the CPU 101. The RAM 102 receives a user input from the touch panel sheet 201 or various hardkeys 203 to 213 and acquires content of operation via an input device controller 301. Then, display screen data is generated based on the acquired content of operation and the control programs described above on the CPU 101. The control programs include a program for realizing a web browser function, and a user management function is provided at the application level (not at the OS level).

Furthermore, the generated screen data is stored in the VRAM 105, and after that, it is outputted to the LCD 202 via an output device controller 302 for controlling a screen output device.

Furthermore, a signal is given to the output device controller 302 from the CPU 101 in accordance with the control programs based on a user input or the apparatus condition to appropriately light up or light out the LED 215, the tally lamps 216 and 217, the power supply lamp 218 and the like.

Detailed description will be made below on examples in which an image processing apparatus configured as described above is used, with reference to drawings.

FIRST EXAMPLE

Figure 4A:
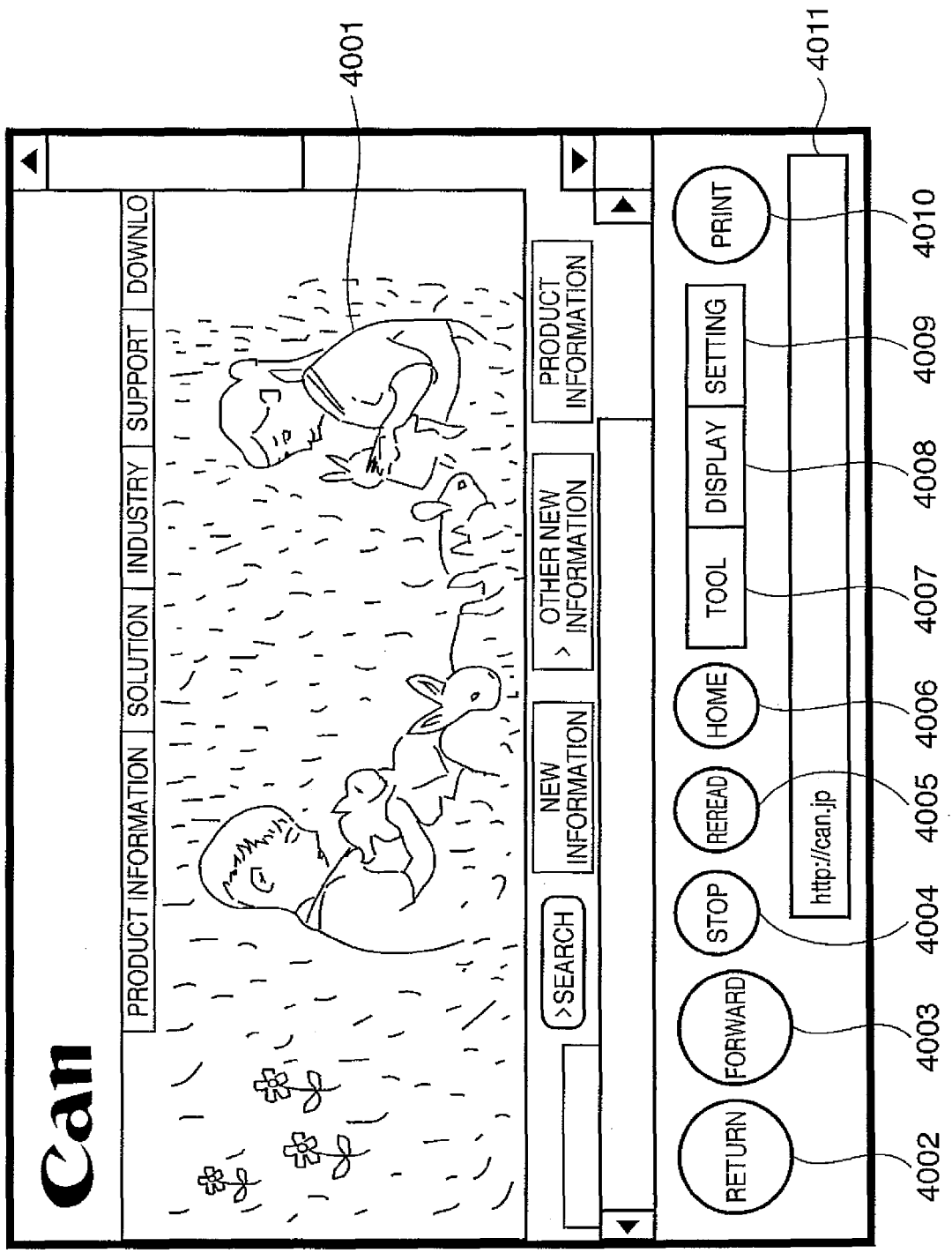
FIG. 4A is an example of a display screen to be displayed when a web browser function is selected in the image processing apparatus according to the embodiment described above.

FIGS. 4A to 4J show examples of a display screen to be displayed on the LCD display section 202 in a first example of the present invention. FIG. 4A shows an example of a display screen to be displayed when a web browser function is selected in the image processing apparatus according to this embodiment described above, in which restrictions are not set on the web browser function. In FIG. 4A, reference numeral 4001 denotes a content display area.

The content display area 4001 is an area in which a so-called web page, such as HTML content, acquired from a web server via the LAN 111 or the public line (WAN) 151 is formed and displayed based on a format in accordance with the description. As shown in FIG. 4A, scroll bars are displayed at the right and bottom portions of the display area as necessary to enable display of content with a size larger than the size of this display area. If a symbol on the content displayed in the display area is linked to some page, it is possible to acquire and display content on the page to which the symbol is linked by pressing the symbol on the touch panel 201.

Furthermore, in FIG. 4A, by pressing each of symbols 4002 to 4011 on the touch panel sheet 201, it is possible to perform operation corresponding thereto.

That is, reference numeral 4002 denotes a return key. By pressing this return key 4002, it is possible to switch the content currently displayed on the content display area 4001 to the content displayed immediately before the current content. Reference numeral 4003 denotes a forward key. If content display history is traced with the use of the above-described return key 4002, it is possible to display content immediately after the traced content on the content display area 4001 by pressing this forward key 4003.

Furthermore, reference numeral 4004 denotes a stop key. When web content is being read, it is possible to stop the reading by pressing this stop key 4004. Furthermore, reference numeral 4005 denotes a reread key. By pressing this reread key 4005, the web content currently displayed is reread from a web server indicated by the URL and displayed. Reference numeral 4006 is a home key. By pressing this home key 4006, it is possible to acquire content from a URL address set as a home page and display it.

Reference numeral 4007 denotes a tool key. By pressing this tool key 4007, it is possible to display a screen for using special functions related to web browsing. These functions include, for example, a bookmark function capable of storing a URL address in advance to quickly specify a web page by specifying the stored URL address, a page storage function of downloading the web content currently displayed from a web server and storing it in a storage device such as the HDD 104, a history function capable of listing up URL addresses of web content displayed in the past and displaying a web page of a specified URL, and the like.

Furthermore, reference numeral 4008 denotes a display key, which is a tool making it possible to, by pressing the display key 4008, display a screen for making settings related to web content display, such as specification of interpretation of character codes of the web content being displayed in the content display area 4001, specification of Japanese hyphenation and a justification function, specification about whether an image such as a JPEG image is to be displayed or not, and the like.

Furthermore, reference numeral 4009 denotes a setting key, which is a tool making it possible to, by pressing the setting key 4009, display a screen for making settings related to web browsing, such as setting of a proxy address, setting of the URL address of a home page, setting of cache size or a certification, and setting of restriction on operation and display.

Furthermore, reference numeral 4010 denotes a print key. By pressing this print key 4010, a setting screen for printing out the web content currently displayed in the content display area 4001 from the printer 195 is displayed. This tool makes it possible to print out web content from the printer 195 by instructing start of printing from this setting screen. When web content is printed by this print key 4010, the printing is performed after layout is adjusted so that the web content is appropriately fit in the paper size specified for printing.

Furthermore reference numeral 4011 denotes an address bar. In this address bar 4011, the URL address of the web content currently displayed in the content display area 4001 is displayed. By pressing this address bar 4011, a software keyboard is displayed on the screen, and a user is enabled to input a URL address.

Figure 4B:
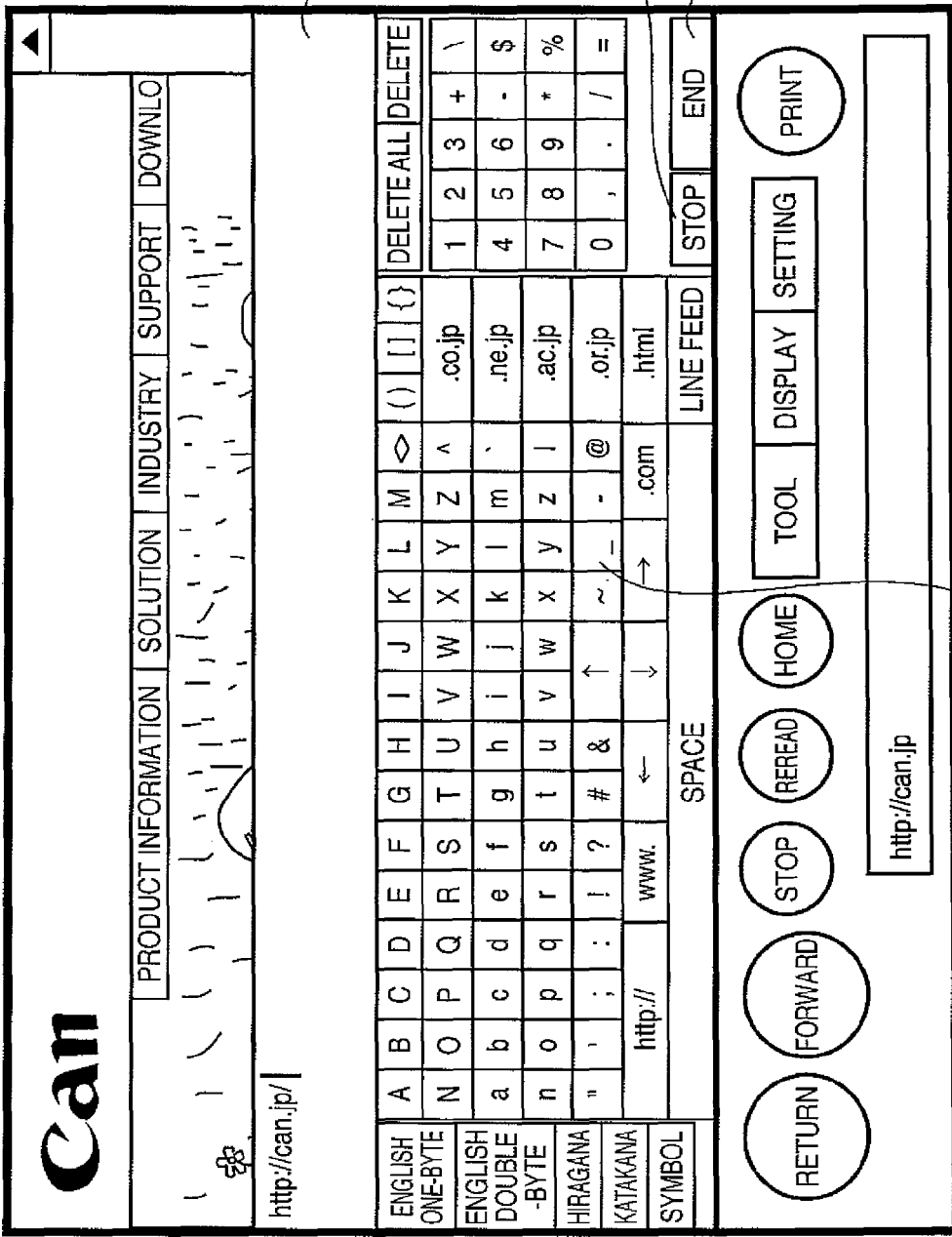
FIG. 4B shows an example of a screen to be displayed when an address bar 4011 is pressed on the screen shown in FIG. 4A.

FIG. 4B shows an example of a screen to be displayed when the address bar 4011 is pressed on the screen shown in FIG. 4A. In FIG. 4B, reference numeral 4101 denotes an input character display area. Reference numeral 4012 denotes a software keyboard. The user can input characters indicating a URL address or the like by pressing keys displayed on the software keyboard 4102. The input character display area 4101 is an area for displaying characters inputted by the software keyboard 4102.

Reference numeral 4103 denotes a stop key. By pressing this stop key 4103, it is possible to discard characters inputted by the software keyboard 4102 and stop display of the software keyboard 4102. Reference numeral 4104 denotes an end key. By pressing this end key 4104, a character string inputted by the software keyboard 4102 and displayed in the input character display area 4101 is reflected in the address bar 4011, and display of the software keyboard 4102 is terminated.

FIG. 4C shows an example of a screen to be displayed when the tool key 4007 is pressed on the screen shown in FIG. 4A. As shown in FIG. 4C, a tool selection screen 4201 is displayed above the tool key 4007. In the tool selection screen 4201, there are keys for selecting three functions denoted by reference numerals 4202 to 4204.

In FIG. 4C, reference numeral 4202 denotes a bookmark key. By pressing this key, it is possible to display a bookmark editing screen. Reference numeral 4203 denotes a page storage key. By pressing this key, it is possible to display a page storage editing screen. Reference numeral 4204 denotes a history key. By pressing this key, it is possible to display a history editing screen.

Figure 4D:
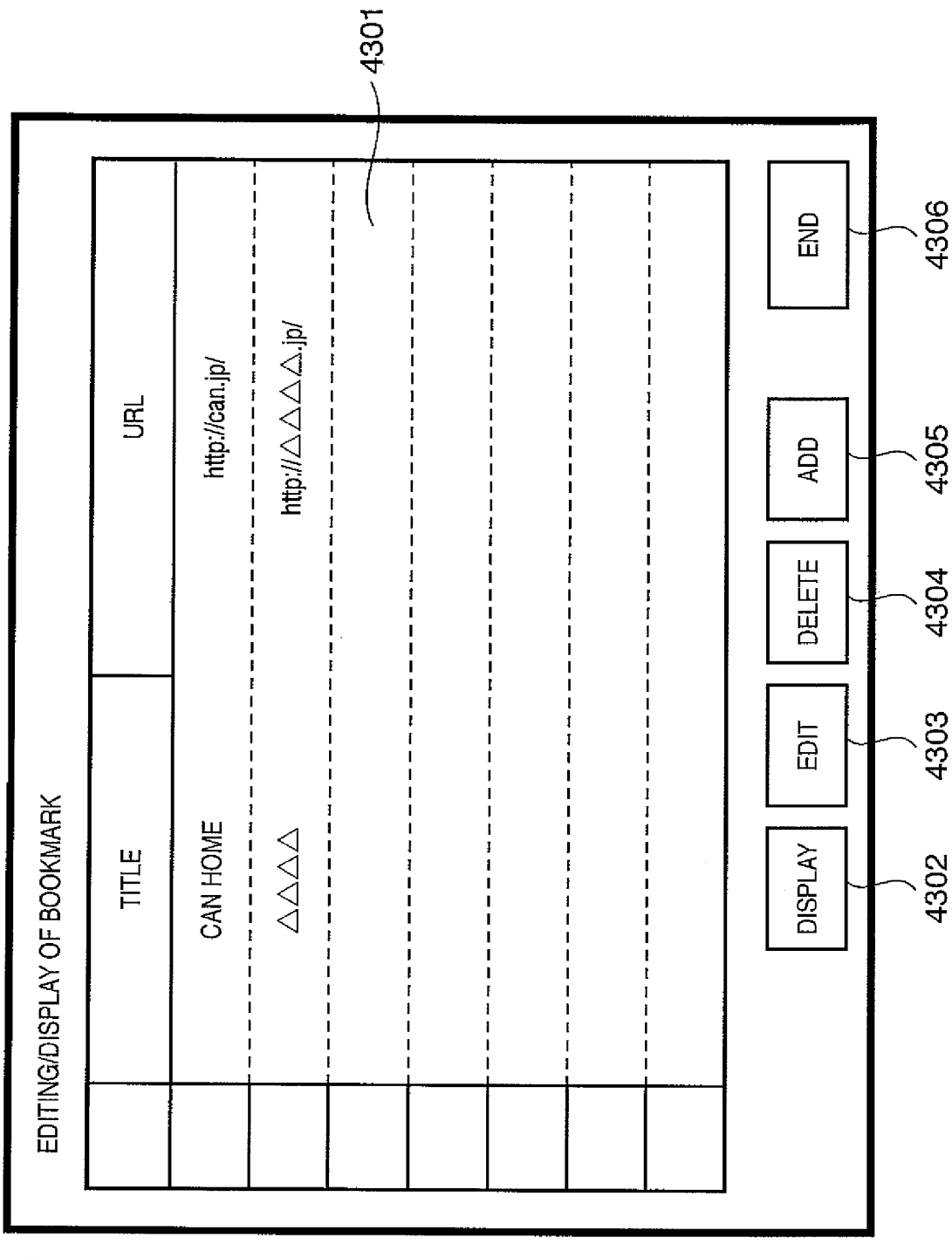
FIG. 4D shows an example of a screen to be displayed when a bookmark key 4202 is pressed on the screen shown in FIG. 4C.

FIG. 4D shows an example of a screen to be displayed when the bookmark key 4202 is pressed on the screen shown in FIG. 4C. On the screen shown in FIG. 4D, it is possible to specify and display a URL stored as a bookmark in advance, edit a URL address stored as a bookmark or a title associated with the address, delete a stored bookmark, or register the URL of web content currently displayed in the content display area 4001 as a bookmark.

In FIG. 4D, reference numeral 4301 denotes a bookmark list display area. In this example, a bookmark is stored as a pair of a URL address and a title character string indicating the content. In the bookmark list display area 4301, the title character strings and the URL's are displayed as a list. The user can select any one bookmark from this list, and can perform various operations for the selected bookmark with the use of bookmark operation keys 4302 to 4305.

First, reference numeral 4302 denotes a display key. By pressing this display key 4302, it is possible to acquire web content from the URL address of the bookmark currently selected and display it in the content display area 4001. Reference numeral 4303 denotes an edit key. By pressing this key, a screen for editing the URL address or the title character string of the bookmark currently selected is displayed.

Reference numeral 4304 denotes a delete key. By pressing this delete key 4304, the bookmark currently selected is deleted from the bookmark list display area 4301, and information corresponding to the deleted bookmark, which is stored in the HDD 104 or the like, is also deleted.

Furthermore, reference numeral 4305 is an add key. By pressing this add key 4305, it is possible to store the URL address of the web content currently displayed in the content display area 4001 in a storage area of the HDD 104 or the like as a new bookmark and add it to the bookmark list display area 4301. Furthermore, reference numeral 4306 denotes an end key. By pressing this end key 4306, it is possible to close this bookmark editing screen.

Figure 4E:
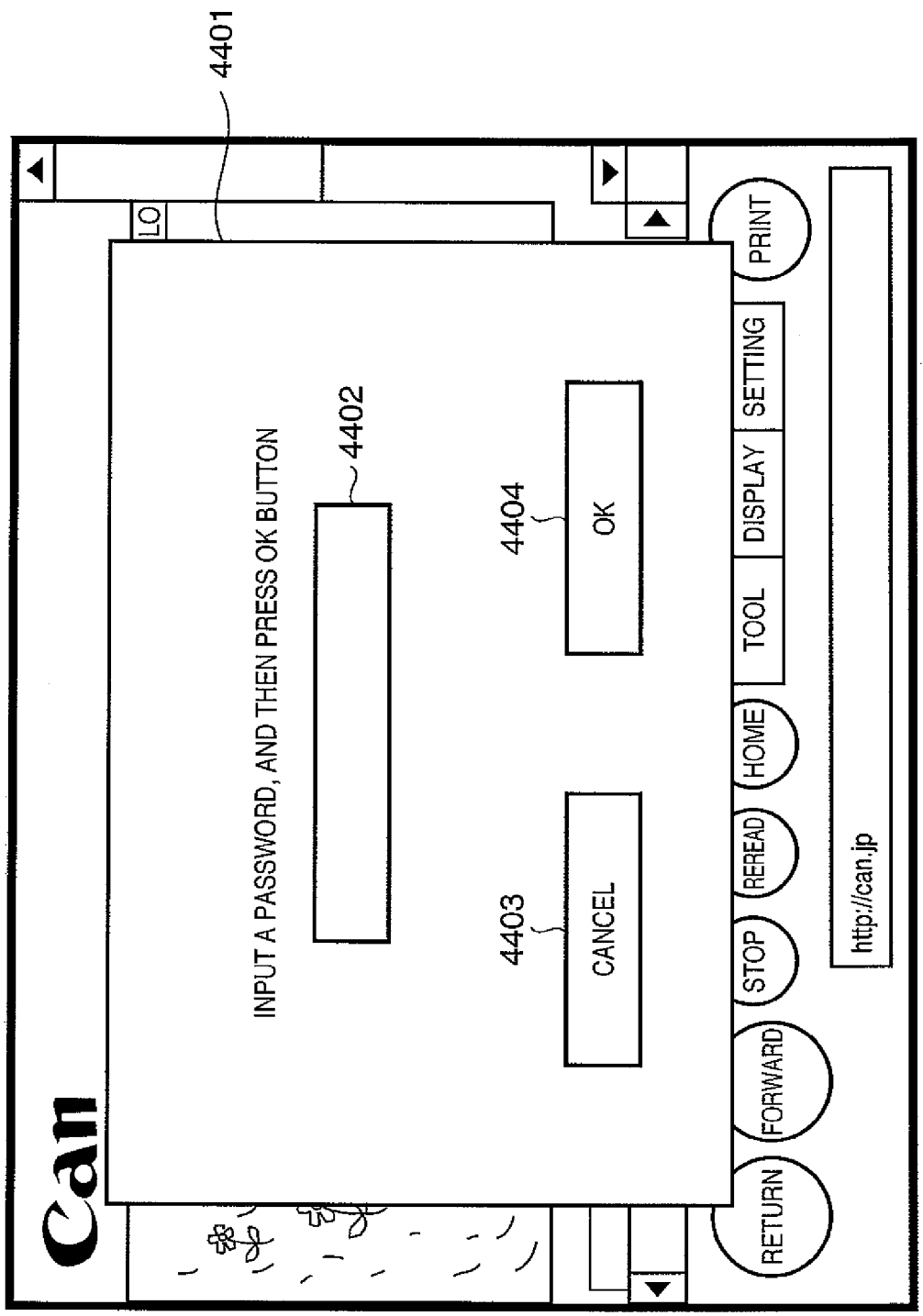
FIG. 4E shows an example of a screen to be displayed when a setting key 4009 is pressed on the screen shown in FIG. 4A.

FIG. 4E shows an example of a screen to be displayed when the setting key 4009 is pressed on the screen in FIG. 4A. However, this screen is displayed only when an administrator password is set. When the an administrator password is not set, the screen shown in FIG. 4F is displayed.

As shown in FIG. 4E, if the setting key 4009 is pressed, a password input screen 4401 is displayed. This screen is displayed to determine whether the user attempting to make settings is an administrator or not so that a user who can make settings related to web browsing may be limited only to a user authorized as an administrator before the settings related to web browsing are made.

In FIG. 4E, reference numeral 4402 denotes a password input display area. The user inputs a password configured by about five numeric characters with the use of the ten key group 206 described above. The inputted password is displayed as symbols such as "***" in the password display area 4402**.

Reference numeral 4403 denotes a cancel key. If this cancel key 4403 is pressed, this screen is closed without performing password authentication. In this case, the display screen returns to the display screen in FIG. 4A.

Furthermore, reference numeral 4404 denotes an OK key. By pressing this OK key 4404, it is determined whether or not an inputted password corresponds to an administrator password set in advance. If it is determined that they correspond to each other, then a web browsing function setting screen shown in FIG. 4F is displayed. On the other hand, if it is determined that they do not correspond to each other, then the user is notified to that effect, the inputted password is cleared, and then input of a password is requested again.

FIG. 4F is an example of a screen to be displayed when it is determined that a password inputted on the screen shown in FIG. 4E corresponds to an administrator password. The screen shown in FIG. 4F is also displayed if the setting key 4009 in FIG. 4A is pressed when an administer password is not set. The screen shown in FIG. 4F is a part of a screen for making various settings for web browsing, and there are various kinds of setting items other than those shown in FIG. 4F. On the screen in FIG. 4F, reference numerals 4501 to 4505 denote checkboxes for setting selection of operations and displays which users are inhibited to perform in web browsing. Reference numeral 4506 denotes a checkbox for setting an administrator password.

Reference numeral 4501 denotes a URL input inhibition check key. By pressing this URL input inhibition check key 4501 to give a checkmark in the checkbox, it is possible to set inhibition of input of a URL address by a user. Reference numeral 4502 denotes a bookmark editing inhibition check key. By pressing this bookmark editing inhibition check key 4502 to give a checkmark in the checkbox, it is possible to set inhibition of operations such as addition, editing, and deletion of a bookmark. Furthermore, reference numeral 4503 denotes a print inhibition check key. By pressing this print inhibition check key 4503 to give a checkmark in the checkbox, it is possible to set inhibition of an printing operation.

Reference numeral 4504 denotes a page storage inhibition check key. By pressing this page storage inhibition check key 4504 to give a checkmark in the checkbox, it is possible to set inhibition of a page storage operation. Reference numeral 4505 denotes a home page setting inhibition check key. By pressing this home page setting inhibition check key 4505 to give a checkmark in the checkbox, it is possible to set inhibition of an operation of editing a home page. Reference numeral 4506 denotes an administrator password setting display area. The user uses the ten key group 206 to set a password with the use of, for example, about five numeric characters. The set password is displayed as symbols such as "***" in the setting display area 4506** so that it is not read even if it is snooped by a third person.

Furthermore, reference numeral 4507 denotes a previous key. By pressing this previous key 4507, it is possible to display a screen immediately before the current screen, among screens for setting various setting items for web browsing. Reference numeral 4508 denotes a next key. By pressing this next key 4508, it is possible to display a screen immediately after the current screen, among the screens for setting various setting items for web browsing. Furthermore, reference numeral 4509 denotes an end key. By pressing this end key 4509, it is possible to close the setting screen shown in FIG. 4F.

Figure 4G:
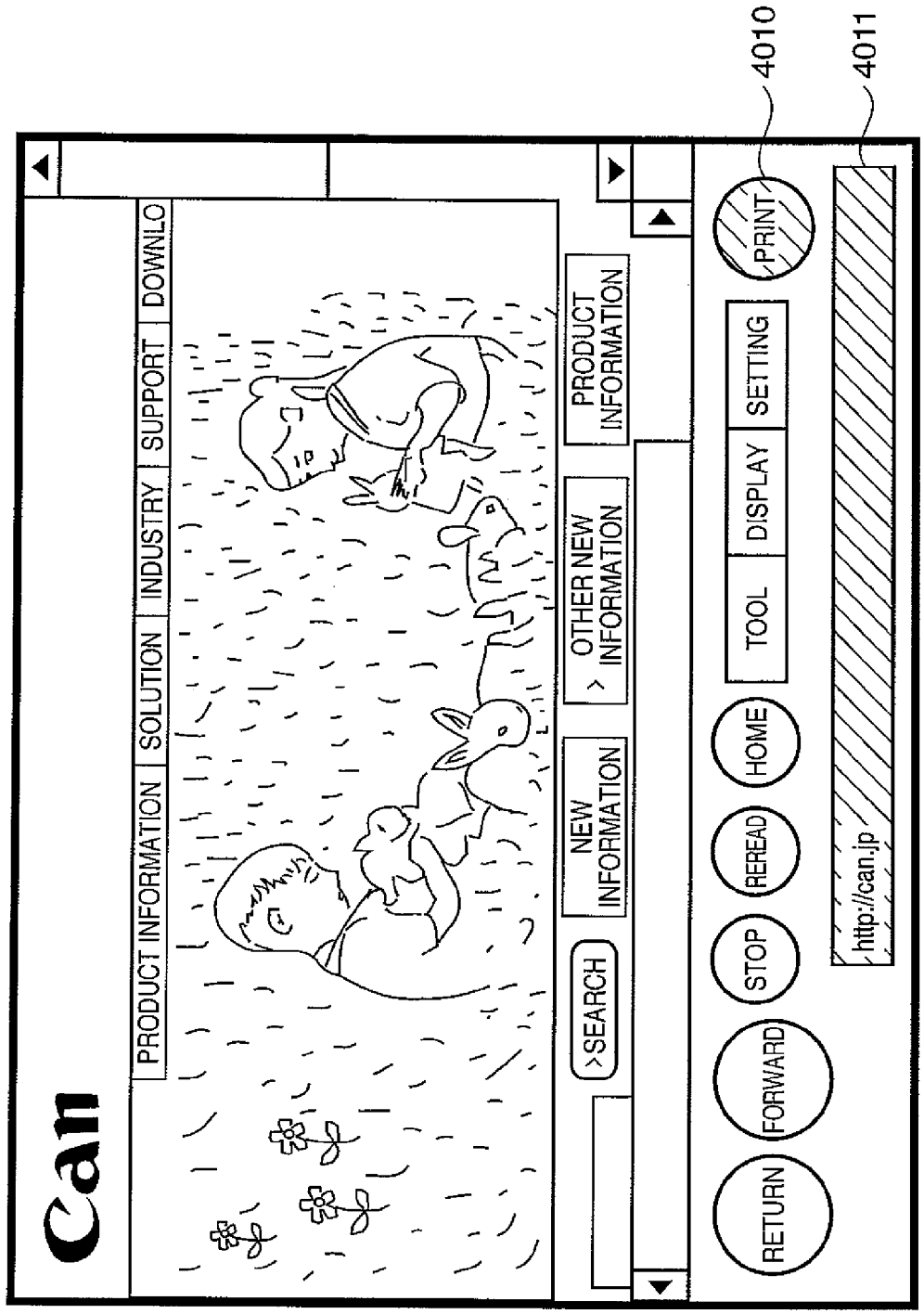
FIG. 4G shows an example of a display screen corresponding to the screen shown in FIG. 4A in the case where restrictions are set for the web browsing function as shown on the screen in FIG. 4F.

FIG. 4G shows an example of a display screen corresponding to the screen shown in FIG. 4A in the case of having made the web browsing function restriction settings as shown on the screen in FIG. 4F. Since inhibition of printing is set by the print inhibition check key 4503 in FIG. 4F, the print key 4010 in FIG. 4G is displayed as disabled (for example, reverse display indicating impossibility of selection) so that a user cannot operate it. Even if the user presses the print key 4010 in this condition, nothing occurs (because it cannot be operated), and the user cannot print web content.

Furthermore, since inhibition of operation of inputting a URL address is set by checking the checkbox of the URL input inhibition check key 4501 in FIG. 4F, the address bar 4011 in FIG. 4G is displayed as disabled (for example, reverse display) so that a user cannot operate it. Even if the user performs an operation of pressing the address bar 4011 in this condition, the software keyboard as shown in FIG. 4B is not displayed, and the user cannot specify a URL to display a web page.

Figure 4H:
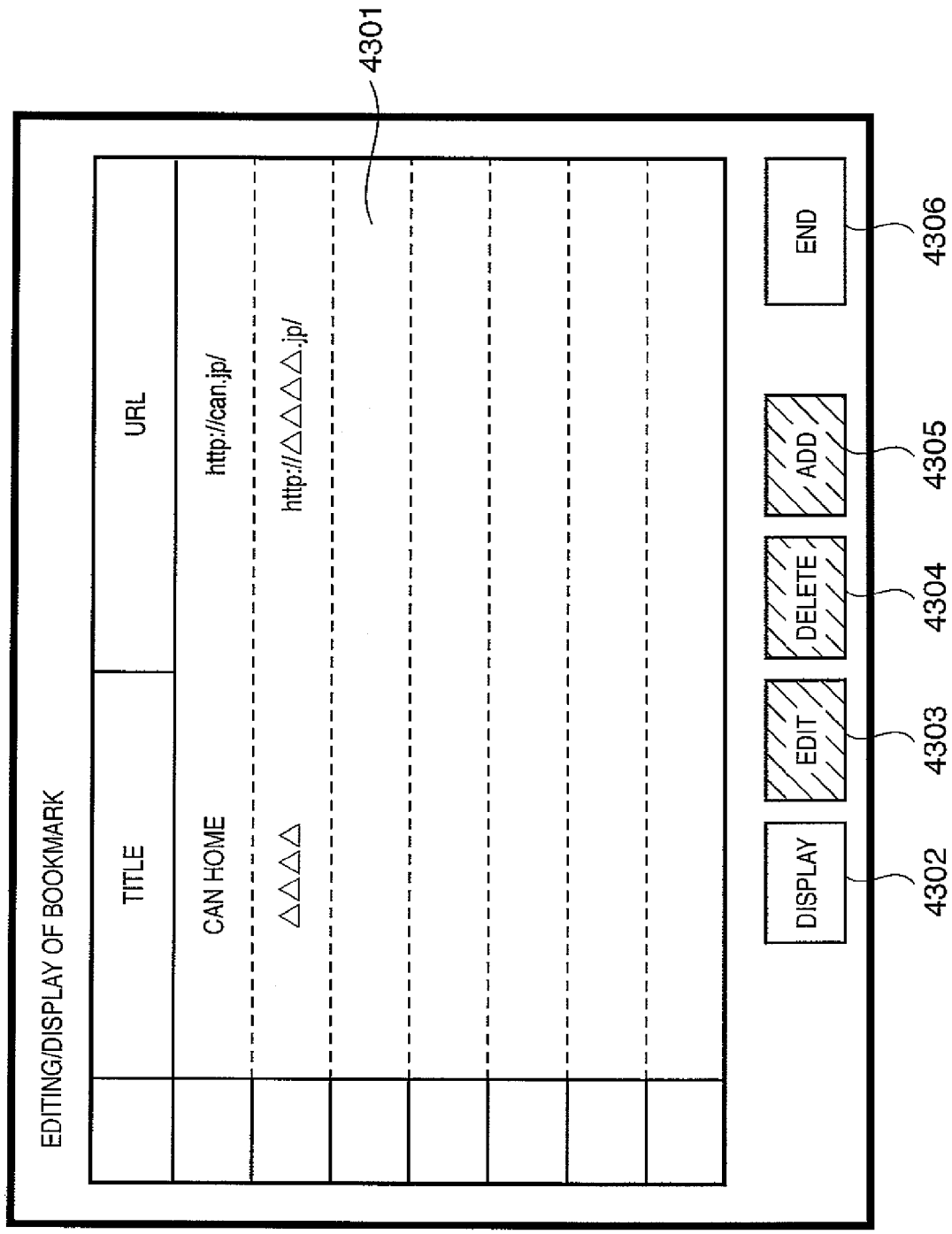
FIG. 4H shows an example of a display screen corresponding to FIG. 4D in the case where settings as shown on the screen in FIG. 4F is made.
Figure 41:
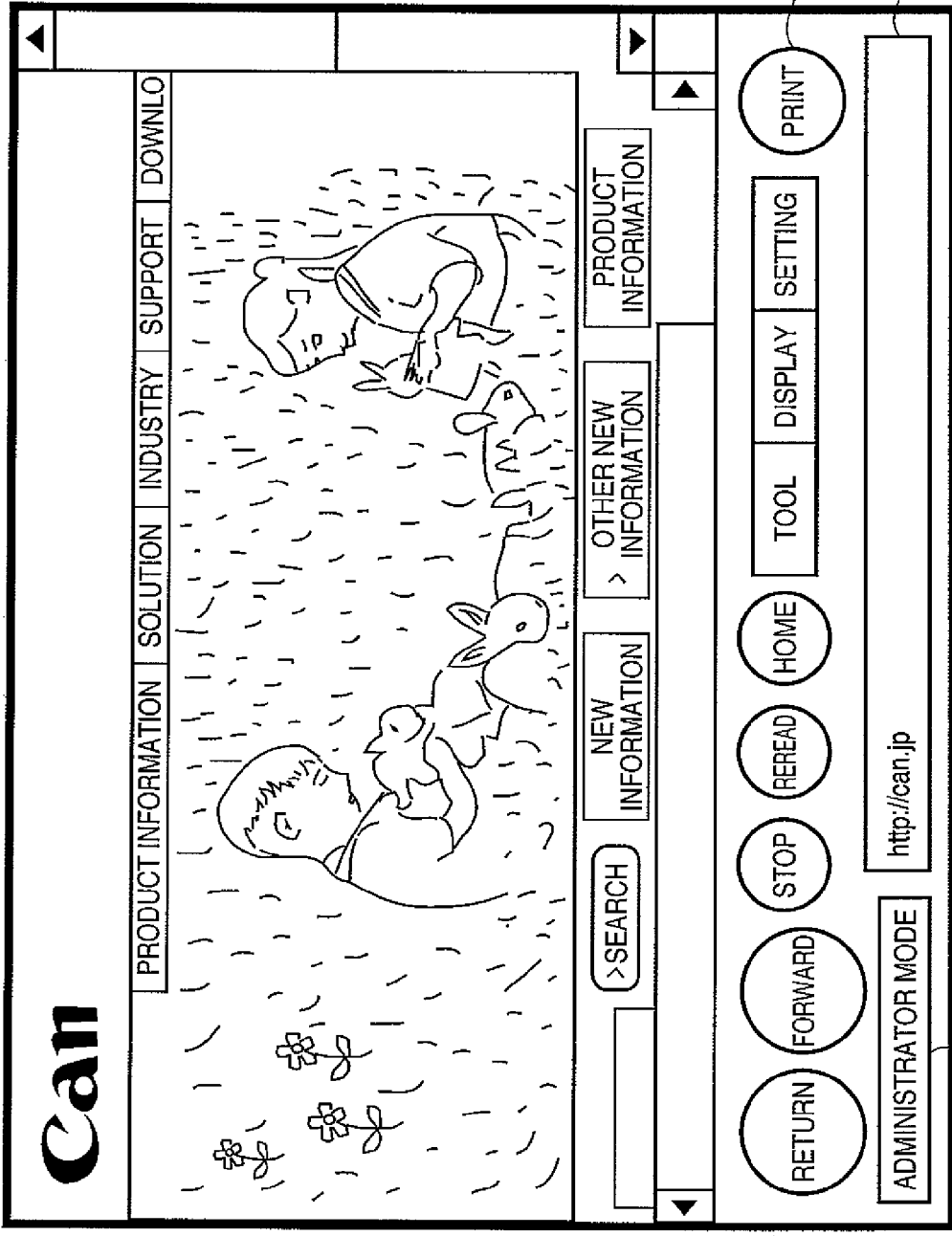

FIG. 4H shows an example of a display screen corresponding to FIG. 4D in the case of having made settings as shown on the screen in FIG. 4F. By the checkmark set for the bookmark editing inhibition check key 4502 on the screen shown in FIG. 4F, operations such as editing, deletion and addition of a bookmark are inhibited. Thereby, as shown in FIG. 4H, all of the page edit key 4203, the delete key 4304 and the add key 4305 are displayed as disabled (for example, reverse display) so that they cannot be selected. Thereby, the administrator can enable a user, who is permitted to perform an operation of displaying a bookmark, to browse only particular bookmarks specified by the administrator.

As described above, the administrator of this apparatus (system) can freely set items to be inhibited for users in web browsing, and thereby, it is possible to preferably perform management for limitation browsing only to particular servers, protection of apparatus hardware resources and the like, suppression of printing cost.

Herein, items to be operated are restricted depending on whether the operator is an administrator or a common user (whether the operation is performed in the administrator mode or in a normal state). However, restrictions may differ for each user. In this case, though user management is complicated, it is possible to set more detailed use restrictions. Content of restrictions is held in the RAM 102 as user management information.

Next, the content of the processing performed on each of the screens shown in FIGS. 4A to 4H will be described with the use of each of flowcharts shown in FIGS. 5A to 5D. The procedures are stored in the ROM 103 for programs or the HDD 104 and executed as necessary in this apparatus.

Figure 5A:
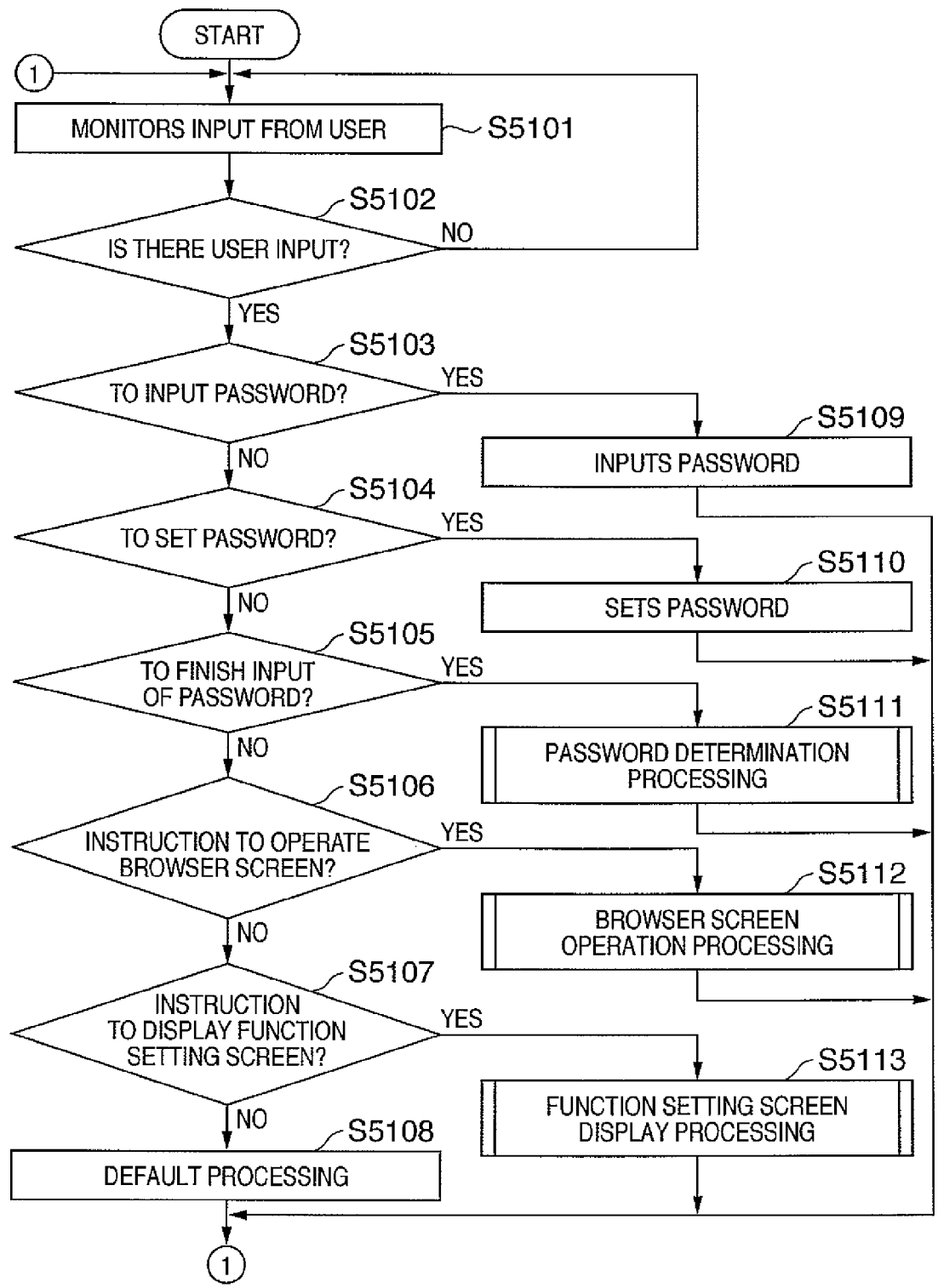
FIG. 5A is a flowchart for illustrating main processing to be performed when a web browser is activated in a first example.

FIG. 5A is a flowchart for illustrating main processing to be performed when a web browser is activated in the first example. First, the input device controller 301 monitors input by a user from the touch panel sheet 201 and the various hardkeys 203 to 213 (step S5101).

Next, it is determined whether there is an instruction (input) from the user (step S5102). As a result, if it is determined that there is not an instruction from the user (No), then the procedure returns step S5101 and continues monitoring of input. On the other hand, if it is determined that there is an instruction from the user at step S5102 (Yes), then it is determined what the user instruction was through steps S5103 to S5107. Then, after performing processing corresponding to the instruction input through steps S5108 to S5113, the procedure returns to step S5101 and monitors the next input from the user.

If it is determined at step S5103 that the instruction from the user is an instruction to input a password (Yes), then the password input screen as shown in FIG. 4E is displayed, and a password is inputted in the password display area 4402 (step S5109). After that, the procedure returns to the processing of step S5101.

If the instruction is not to input a password at step S5103 (No), then it is determined whether the instruction input from the user is an instruction to set a password (step S5104). As a result, if it is determined that the instruction is to set a password (Yes), then the screen shown in FIG. 4F is displayed, and a password is set in the password setting display area 4506 (step S5110). After that, the procedure returns to the processing of step S5101.

If the instruction is not to set a password at step S5104 (No), then it is determined whether the instruction from the user is an instruction to finish input of a password (step S5105). As a result, if it is determined that the instruction is an instruction to finish input of a password (Yes), that is, if it is determined that the OK key 4404 in FIG. 4E has been pressed, then, password determination processing is performed (step S5111). After that, the procedure returns the processing of step S5101.

Figure 5B:
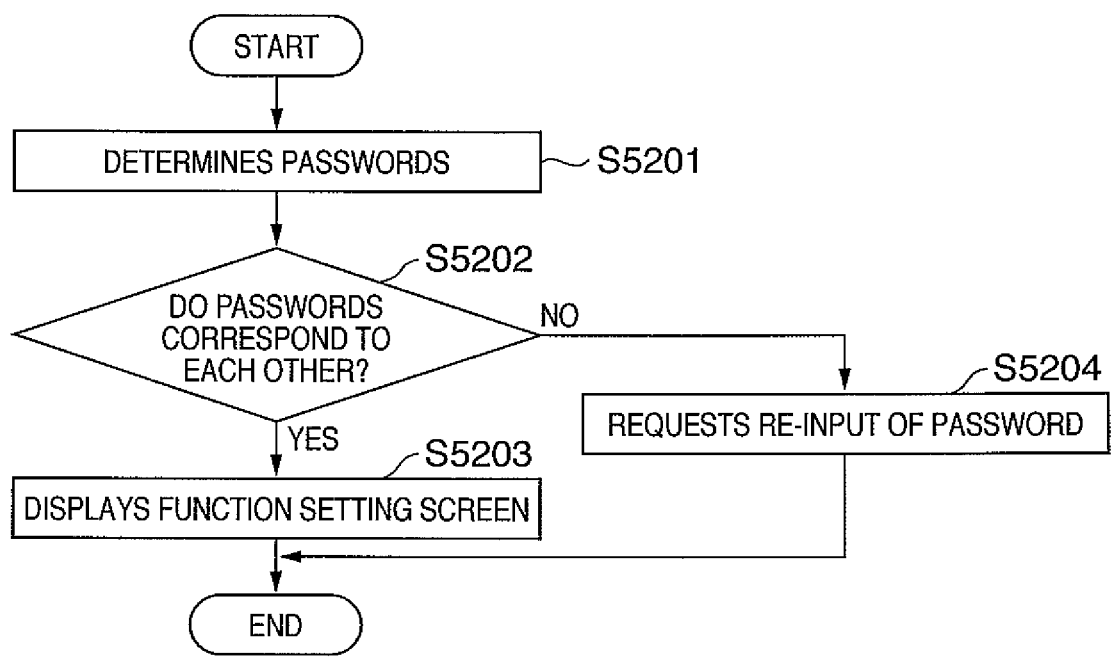
FIG. 5B is a flowchart for illustrating details of password determination processing of step S5111.

FIG. 5B is a flowchart for illustrating details of the password determination processing of step S5111. The processing is performed when it is determined that the input instruction from the user is an instruction to finish input of a password.

First, it is determined whether the inputted password corresponds to an administrator password stored in advance (step S5201). As a result, if the passwords correspond to each other (step S5202: Yes), then the function setting screen shown in FIG. 4F is displayed (step S5203). On the other hand, if the passwords do not correspond to each other (step S5202: No), then password re-input processing is performed (step S5204). This is processing for notifying the user that the passwords do not correspond to each other, clearing the inputted password, and prompting the user to re-input a password.

If it is determined that the instruction is not an instruction to finish input of a password at step S5105 (No), then it is determined whether the instruction input from the user is an instruction to perform operation of a web browser screen (step S5106). As a result, if it is determined that the instruction input from the user is an instruction to perform operation of a web browser screen (Yes), then browser screen operation processing is performed (step S5112). After that, the procedure returns to the processing of step S5101.

Figure 5C:
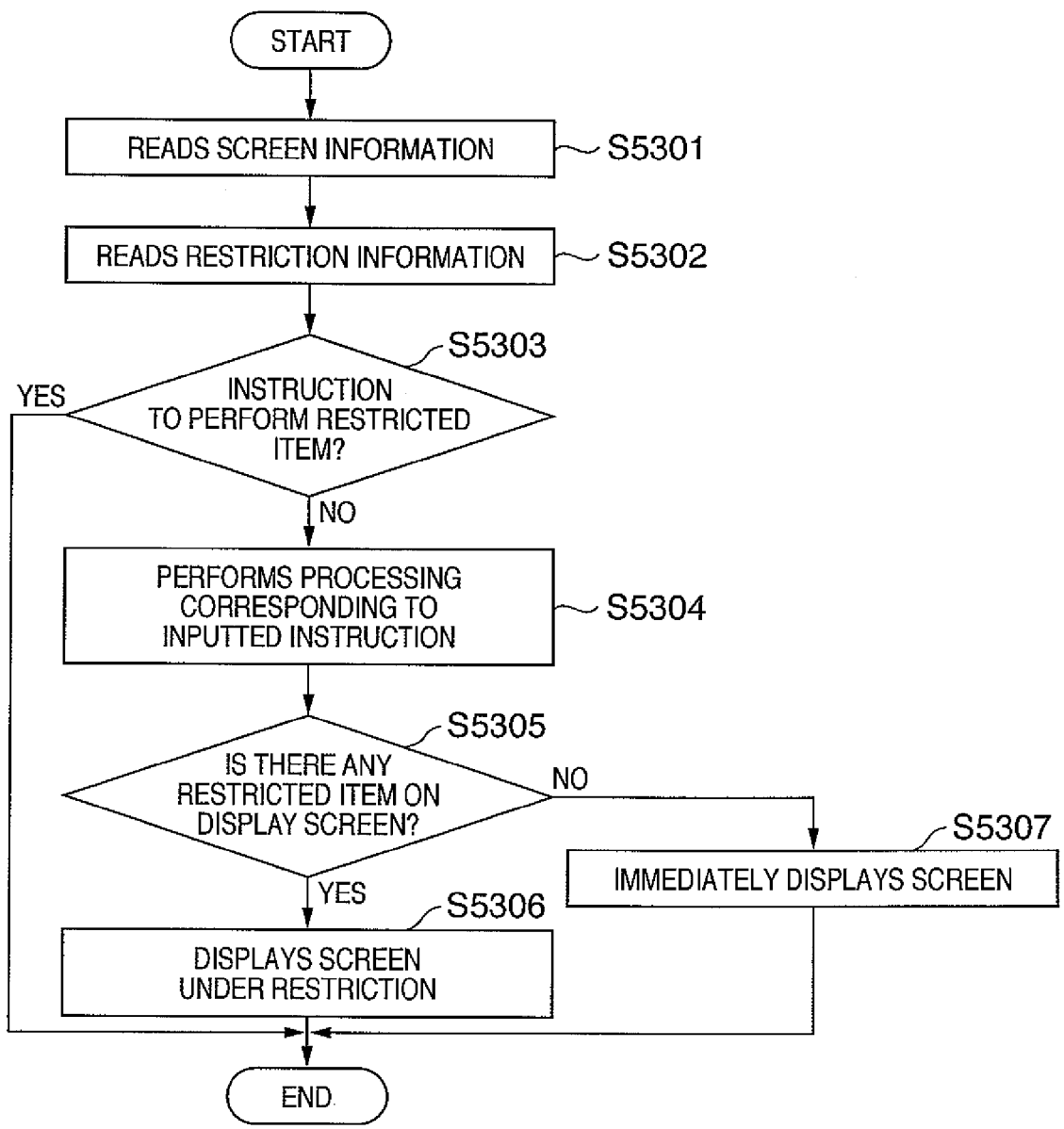
FIG. 5C is a flowchart for illustrating details of browser screen operation processing of step S5112.

FIG. 5C is a flowchart for illustrating details of the browser screen operation processing of step S5112. This processing is performed when the input instruction from the user is determined to be an instruction to perform operation of a browser screen, at step S5106 in FIG. 5A.

First, screen information about which keys and display areas the currently displayed screen is configured by is read (step S5301). Next, settings of an item for which input or operation is inhibited (restriction information) are read (step S5302). Then, it is determined, from the screen configuration information, which key or display area the operation corresponds to, and then it is determined whether display of the key or display area is functionally restricted (step S5303).

As a result, if it is determined at step S5303 that display is functionally restricted (Yes), then the processing is terminated without doing anything. On the other hand, if it is determined that display is not functionally restricted (No), then processing corresponding to the specified key or display area is performed (step S5304).

Furthermore, if the display screen is switched as a result of the processing of step S5304, it is determined whether there is any restricted function item (step S5305). As a result, if it is determined that there is no such restricted item (No), then the screen being displayed is immediately displayed (step S5307). On the contrary, if it is determined that there is any restricted item (Yes), then the restricted item is changed to be displayed as disabled (for example, reverse display) so that the screen is displayed under restriction (step S5306).

If it is determined at step S5106 that the instruction input is not an instruction to operate a browser screen (No), then it is determined whether or not the instruction input from the user is an instruction to display the function setting screen (step S5107). As a result, if it is determined that the setting key 4009 in FIG. 4A has been pressed (Yes), then function setting screen display processing is performed (step S5113). After that, the procedure returns to the processing of step S5101.

Figure 5D:
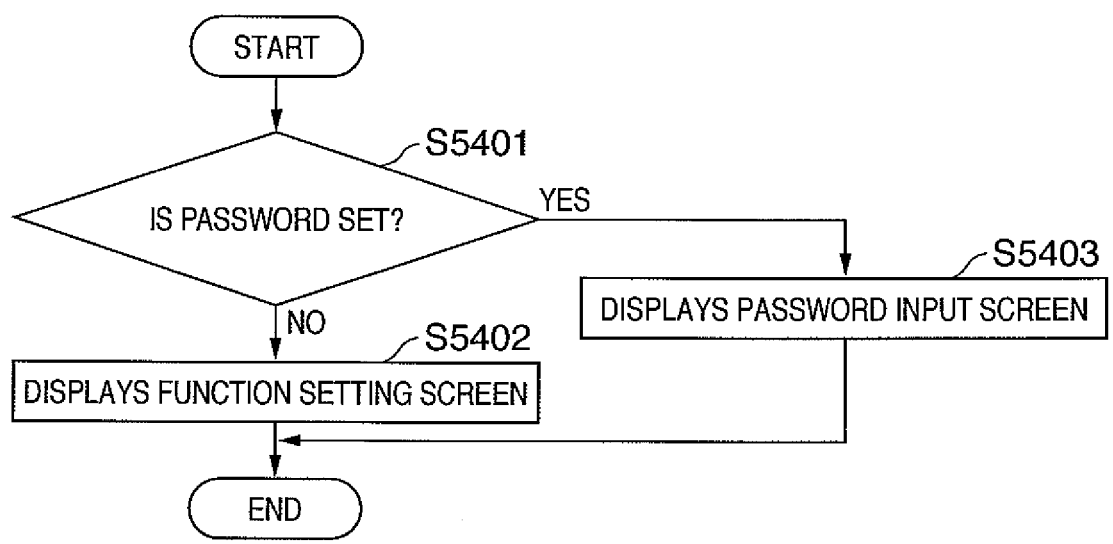
FIG. 5D is a flowchart for illustrating details of function setting screen display processing of step S5113.

FIG. 5D is a flowchart for illustrating details of the function setting screen display processing of step S5113. That is, the flowchart shown in FIG. 5D shows processing to be performed when it is determined at step S5107 in FIG. 5A that the input instruction from the user is an instruction to display the function setting screen.

First, it is determined whether or not an administrator password is currently set (step S5401). As a result, if it is determined that an administrator password is not set (No), then the function setting screen is displayed (step S5402). On the other hand, if it is determined that an administrator password is set (Yes), then the password input screen is displayed (step S5403).

If it is determined at step S5107 that the instruction input from the user is not an instruction to display the function setting screen (No), that is, if it is determined that it does not correspond to any of the above-described steps, then processing (default processing) to the instruction is performed (step S5108). This default processing is not directly related to this invention, and therefore, description thereof will be omitted. After this processing, the procedure returns to the processing of step S5101.

As described above, in this embodiment, in the case where page access restrictions are to be placed on a web browser used by an unspecified number of users, such as a web browser mounted on a software-embedded equipment, an administrator of each equipment can easily place the access restrictions without making complicated and troublesome settings like those for a proxy and a gateway.

SECOND EXAMPLE

Next, a second example of an image processing apparatus according to this embodiment will be described with reference to FIGS. 4A to 4J and FIGS. 6A to 6D. In the second example, difference from the first example will be described in detail, and description of portions common to the first example will be omitted.

In the second example, state transition to an administrator mode is further added to the processing of the first example. This administrator mode is a state indicating that an administrator is operating, to which the mode transitions when a user authorized as an administrator is determined to be certainly an administrator after authentication. The user can perform various operations and settings with authority as an administrator until he exits from this state. It is possible to exit the administrator mode by pressing a particular key.

When the state is the administrator mode, some symbol or the like indicating that the state is the administrator mode is displayed on anywhere on the screen so that the user can confirm the state. In order to transition to the administrator mode, the password input screen 4401 as shown in FIG. 4E is displayed to authenticate whether the user is an administrator, and authentication is performed there. The password input screen can be displayed by pressing a particular key such as the ID key 208.

FIG. 4I shows an example of a screen to be displayed when a password inputted on the screen shown in FIG. 4E is determined to correspond to an administrator password. In the figure, the state has transitioned to the administrator mode because the user has been authenticated as an administrator. In FIG. 4I, reference numeral 4801 denotes display indicating that the state is currently the administrator mode.

FIG. 4I corresponds to the screen in FIG. 4G before transition to the administrator mode. However, when the state transitions to the administrator mode, the address bar 4011 and the print key 4010 are not displayed as disabled (for example, reverse display) and can be operated similarly to the case where inhibition settings are not made, even if the URL input inhibition check key 4501 and the print inhibition check key 4503 have been set on the function setting screen shown in FIG. 4F.

FIG. 4J shows an example of a screen to be displayed when a password inputted on the screen shown in FIG. 4E is determined to correspond to an administrator password. In FIG. 4J, since the state has transitioned to the administrator mode the same as the above-described example, a symbol indicating that the state is currently the administrator mode is displayed as shown as display 4901.

FIG. 4J corresponds to the screen in FIG. 4H before transition to the administrator mode. However, since the state has transitioned to the administrator mode, the edit key 4303, the delete key 4304 and the add key 4305 are not displayed as disabled and can be operated the same as the case where the inhibition settings are not made, even if the bookmark editing inhibition check key 4502 has been set on the function setting screen shown in FIG. 4F.

When the state is the administrator mode, it is possible to exit the administrator mode by pressing the ID key 208. By exiting the administrator mode on the display screen in FIG. 4I when function restrictions have been set on the function setting screen shown in FIG. 4F, the display screen is switched to a display screen as shown in FIG. 4G.

As described above, even when various function restrictions have been set for a web browse, it is possible for only an administrator to use all functions in spite of the restrictions by means of state transition to the administrator mode, and thereby, the administrator's management work can be facilitated.

The procedure for performing such processing will be described with the use of flowcharts shown in FIGS. 6A to 6D. In the description of each flowchart, difference from the first example will be described in detail, and description of portions common to the first example will be omitted.

Figure 6A:
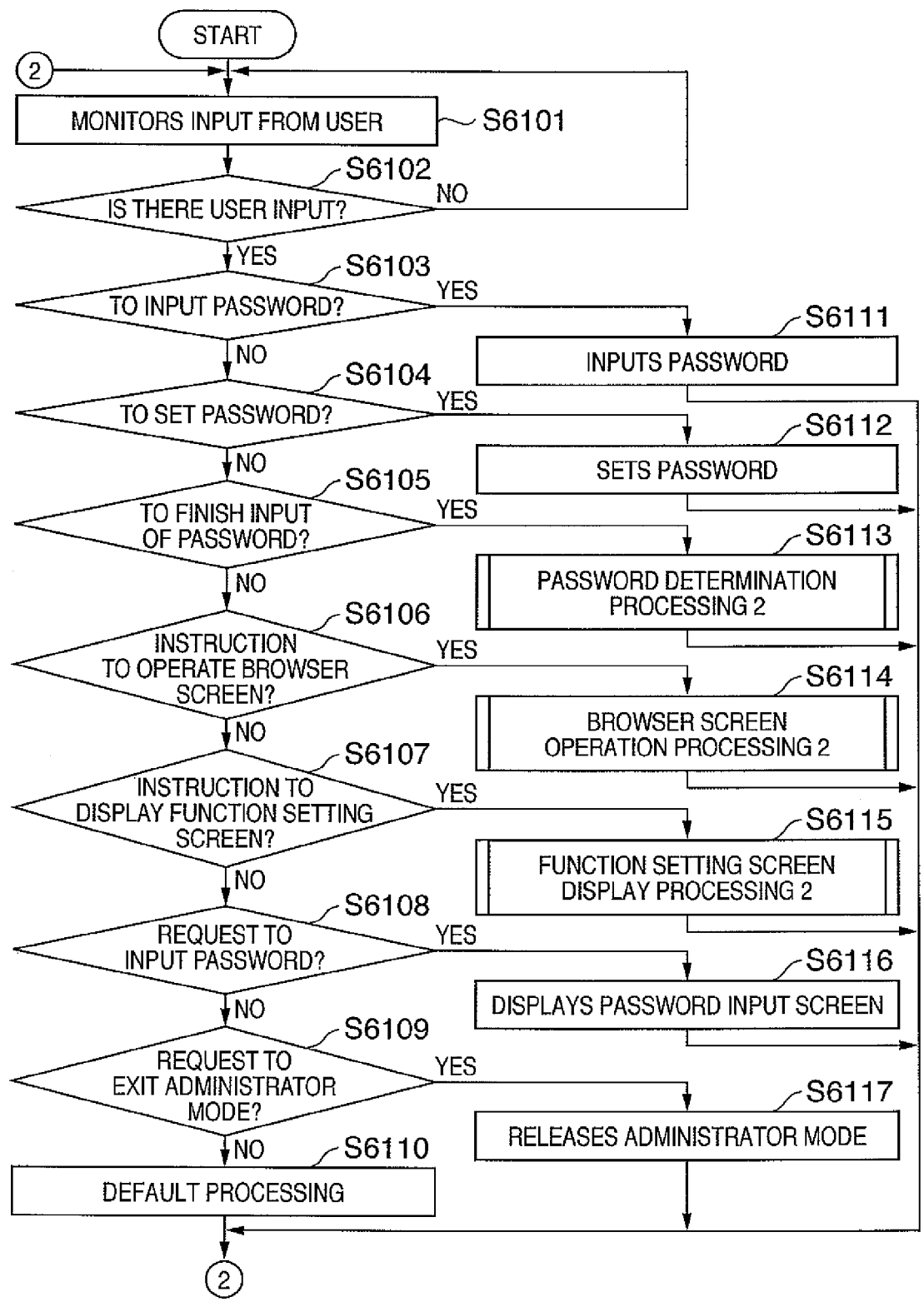
FIG. 6A is a flowchart for illustrating main processing to be performed when a web browser is activated in a second example.

FIG. 6A is a flowchart for illustrating main processing to be performed when a web browser is activated in a second embodiment. First, an instruction (input) from a user is monitored at steps S6101 and S6102, the same as the first example. As a result, if it is determined that there is an instruction from the user, then what was the input is determined through steps S6103 to S6109, and processing corresponding to the instruction input is performed through steps S6110 to S6117.

Here, the processing through steps S6103 to S6107 and the processing of step S6110 are similar to those in the above-described first example, and therefore, description thereof will be omitted.

In FIG. 6A, steps S6108 and S6109 are processings which are newly added in the second example. At step S6108, it is determined whether the instruction input from the user is a request to input a password, that is, whether it is an instruction to transition to the administrator mode by pressing the ID key. As a result, if it is determined that the instruction input is a request to input a password (Yes), then the password input screen 4401 shown in FIG. 4E is displayed (step S6116). After that, the procedure returns to the processing of step S6101.

Meanwhile, at step 6109, it is determined whether the instruction input from the user is a request to release the administrator mode if it is determined at step S6108 that the instruction input is not a request to input a password (No). As a result, if it is determined that the instruction input is a request to release the administrator mode (Yes), then the administrator mode is released, and the display indicating that the state is the administrator mode, such as the display 4801 in FIG. 4I and the display 4901 in FIG. 4J, is deleted (step S6117). After that, the procedure returns the processing of step S6101.

Next, each of processings at steps S6113 to S6115 will be described with the use of each of flowcharts shown in FIGS. 6B to 6D.

Figure 6B:
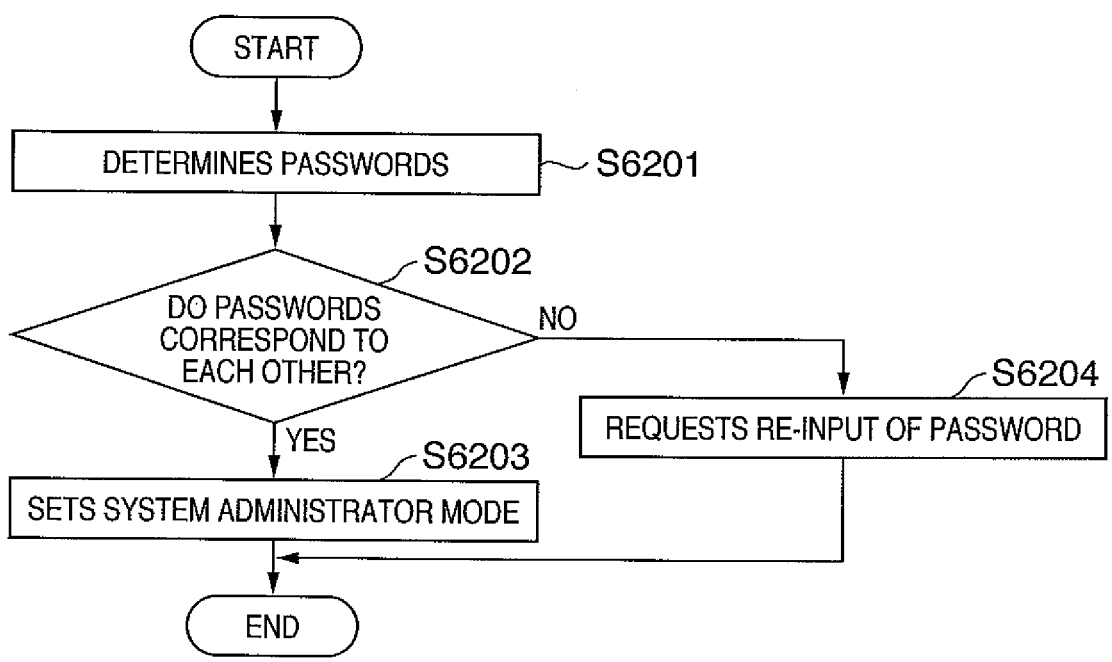
FIG. 6B is a flowchart for illustrating details of password determination processing of step S6113.

FIG. 6B is a flowchart for illustrating details of the password determination processing of step S6113. This processing is performed when the input instruction from a user is determined to be an instruction to finish input of a password at step S6105 in the flowchart in FIG. 6A.

At the password determination processing of step S6113, the same processing as shown by the flowchart in FIG. 5B in the above-described first example is performed, and only the processing of step S6203 is different. At step S6203, if it is determined that the password inputted by the user and an administrator password stored in advance correspond to each other, the state transitions to the administrator mode, and display indicating that the state has transitioned to the administrator mode is shown.

Figure 6C:
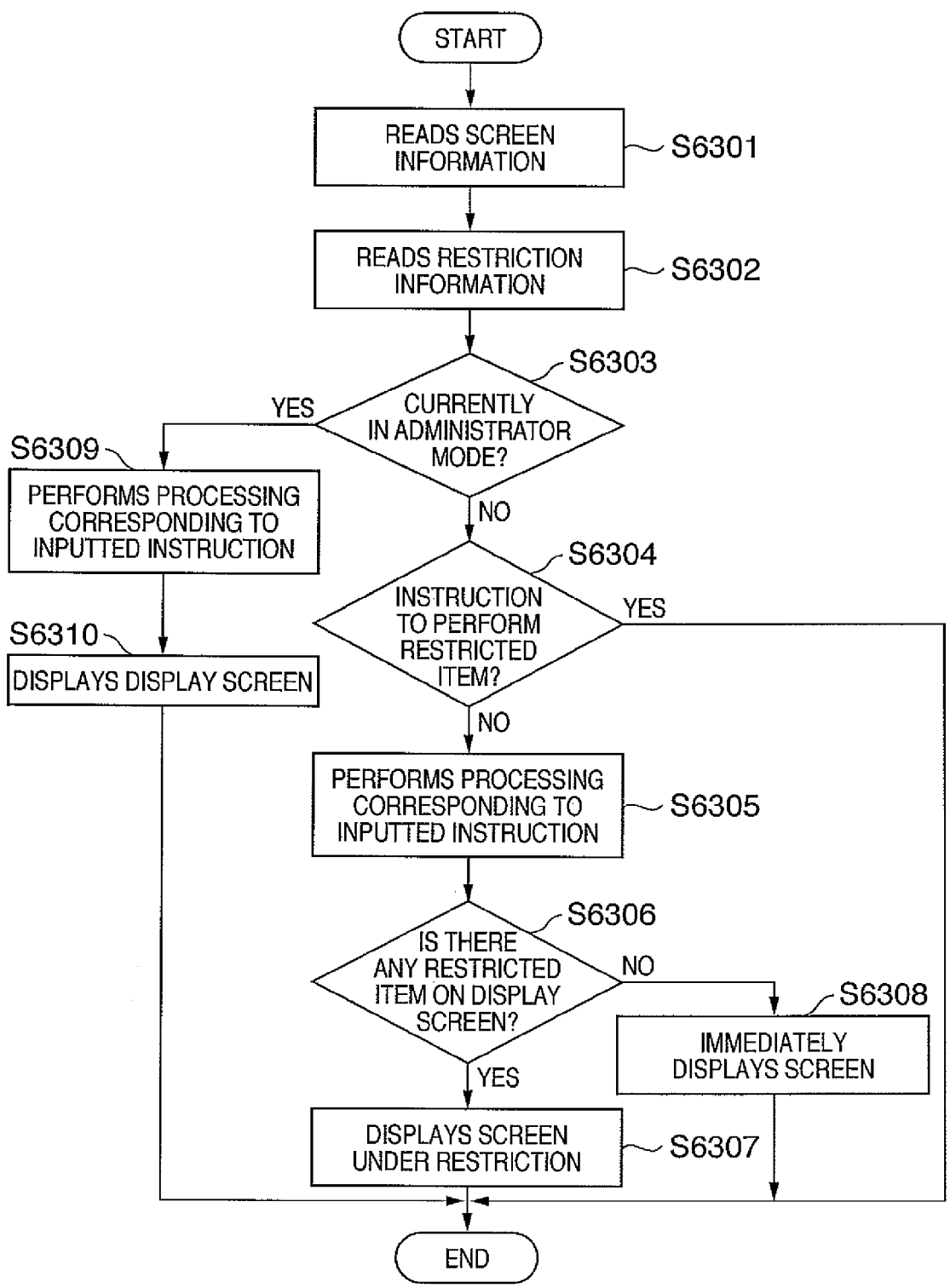
FIG. 6C is a flowchart for illustrating details of browser screen operation processing of step S6114.

FIG. 6C is a flowchart for illustrating details of the browser screen operation processing of step S6114. The processing is performed when it is determined at step 6106 in the flowchart in FIG. 6A that the input instruction from the user is an instruction to operate a browser screen. In this processing, though the same processing of the flowchart shown in FIG. 5C in the above-described first example is performed, processings of steps S6303, S6309 and S6310 are newly added.

At step S6303, it is determined whether the mode is currently the administrator mode. As a result, if it is determined that the state has not transitioned to the administrator mode (No), then the processings at step S6304 and subsequent steps are performed. These processings are the same as described in the flowchart in FIG. 5C. On the contrary, if it is determined that the state has transitioned to the administrator mode (Yes), then the processings of steps S6309 and S6310 are performed.

At step S6309, processing corresponding to a specified key or display area is performed. At step S6310, the display screen is immediately displayed without placing function restrictions.

Figure 6D:
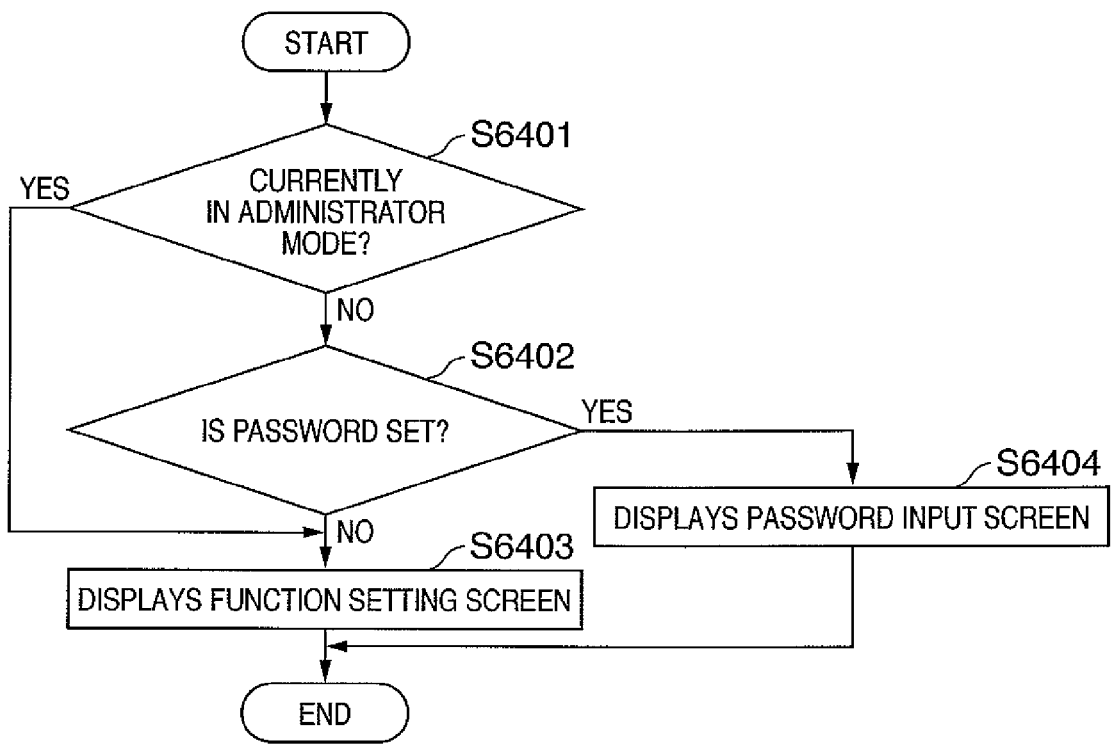
FIG. 6D is a flowchart for illustrating details of function setting screen display processing of step S6115.

FIG. 6D is a flowchart for illustrating details of the function setting screen display processing of step S6115. That is, the flowchart shown in FIG. 6D shows processing to be performed when it is determined at step S6107 in FIG. 6A that the input instruction from the user is an instruction to display the function setting screen. That is, though the same processing as shown by the flowchart in FIG. 5D in the first example is performed, processing of step S6401 is newly added.

At step S6401, it is determined whether the mode is currently the administrator mode. As a result, if it is determined that the mode is the administrator mode (Yes), then the procedure proceeds to processing of step S6403. If it is determined that the mode is not the administrator mode (No), then the procedure proceeds to processing of step S6402. The processings of steps S6402 and S6403 are the same processings in the flow described in the flowchart in FIG. 5D.

As described above, according to the second example, it is further possible to easily make settings without performing processing such as re-login when an administrator makes access restriction settings, in addition to the effect described in the first example. Furthermore, it is possible for the administrator himself to access pages without access restrictions and freely browse necessary content.

In the above embodiment, description has been made on a case where a web browser is integrally incorporated in an image processing apparatus. However, the same processings may be performed by a general-purpose PC or the like. In this case, however, it is necessary to separately perform connection of a printing apparatus, setting of a driver and the like to cause print processing to be performed.

The web browser is not limited to HTML content but is, of course, applicable to various forms such as those corresponding to XML or SOAP.

Other Embodiments

Embodiment examples have been described above. However, the present invention can be realized in embodiment aspects as a system, an apparatus, a method, a program, a storage medium (recording medium) and the like, for example. Specifically, the present invention can be applied to a system configured by multiple pieces of equipment or applied to an apparatus configured by a single piece of equipment.

There is included a case where the present invention is achieved by directly or remotely supplying software programs for realizing the functions of the above-described embodiment (in the embodiment, programs corresponding to the flowcharts shown in figures) to a system or an apparatus, and by the computer of the system or the apparatus reading and executing the supplied program codes.

Accordingly, the program codes themselves, which are installed on a computer to realize the functions and processings of the present invention by the computer, also realize the present invention. That is, the present invention includes the computer programs themselves for realizing the functions and processings of the present invention.

In this case, the programs may be in the form of object codes, programs to be executed by an interpreter, script data to be supplied to an OS, and the like.

As a recording medium for supplying the programs, there are, for example, a Floppy® disk, hard disk, optical disk, magneto-optical disk, MO, CD-ROM, CD-R, CD-RW, magnetic tape, non-volatile memory card, ROM, DVD (DVD-ROM and DVD-R) and the like.

In addition, as the method for supplying the programs, it is also possible to supply the programs by connecting to an Internet web page with the use of a browser of a client computer and downloading the computer programs of the present invention or a compressed file including an automatic installation function from the web page to a recording medium such as a hard disk. It is also possible to divide the program codes constituting the programs of the present invention into multiple files so that each file may be downloaded from a different web page. That is, a WWW server enabling multiple users to download a program file for realizing the functions and processings of the present invention is also included in the present invention.

Furthermore, it is also possible to encrypt the programs of the present invention, store them in a storage medium such as a CD-ROM and distribute the CD-ROM to users in order to enable a user who satisfies predetermined conditions to download key information for decryption from a web page via the Internet, use the key information to execute the encrypted programs, install them on a computer and realize them.

Furthermore, in addition to the case where the functions of the embodiment described above are realized by a computer executing the read programs, the functions of the embodiment described above can be also realized by an OS or the like, which is operating on the computer, performing a part or all of the actual processing based on instructions of the programs.

Furthermore, the functions of the embodiment described above can be also realized by the CPU, which is provided for a feature expansion board inserted in a computer or a feature expansion unit connected to the computer, performing a part or all of the actual processing based on instructions of the programs, which have been read from a recording medium and written in the memory provided for the feature expansion board or the feature expansion unit.

According to the present invention, when page access restrictions are placed on a web browser to be used by an unspecified number of users, an administrator of each piece of equipment can easily place such access restrictions without making complicated and troublesome settings such as those for a proxy and a gateway.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-348971 filed on Dec. 1, 2004, which is hereby incorporated by reference herein.

What is claimed is:

1. An information processing apparatus comprising:
a Web browser adapted to display content received from an external apparatus;
a display control unit adapted to display a setting screen for setting whether or not editing of bookmarks included in the Web browser is disabled;
a control unit adapted to, in a case where the editing of bookmarks is set as disabled in the setting screen, disable an execution of the editing of bookmarks, and, in a case where the editing of bookmarks is set as enabled in the setting screen, enable the execution of the editing of bookmarks; and
a printing unit adapted to print the content displayed by the Web browser,
wherein the information processing apparatus is a printing apparatus.

2. The apparatus according to claim 1, further comprising a determination unit adapted to determine whether or not a user operating the Web browser is a specific user,
wherein, in a case where the determination unit has determined that the user is the specific user, the display control unit is adapted to display the setting screen, and in a case where the determination unit has determined that the user is not the specific user, the display control unit is adapted to not display the setting screen.

3. The apparatus according to claim 2, wherein, in a case where the determination unit has determined that the user is the specific user, the control unit is adapted to enable the execution of the editing of bookmarks even if the editing of bookmarks is set as disabled.

4. The apparatus according to claim 2, wherein the specific user indicates a user having an authority of an administrator, and the display control unit is adapted to not display the setting screen in a case where the user is not the specific user.

5. The apparatus according to claim 1, further comprising an input unit adapted to input an operation for executing the editing of bookmarks,
wherein the control unit, in a case where the editing of bookmarks is set as disabled in the setting screen, is adapted to disable a user from inputting the operation through the input unit, and, in a case where the editing of bookmarks is set as enabled in the setting screen, is adapted to enable a user to input the operation through the input unit.

6. The apparatus according to claim 5, wherein the input unit is adapted to be displayed on the Web browser.

7. An information processing apparatus comprising:
a Web browser adapted to display content received from an external apparatus;
a display control unit adapted to display a setting screen for setting whether or not setting of homepage is disabled;
a control unit adapted to, in a case where the setting of homepage is set as disabled in the setting screen, disable an execution of the setting of homepage, and, in a case where the setting of homepage is set as enabled in the setting screen, enable the execution of the homepage designation; and
a printing unit adapted to print the content displayed on the Web browser,
wherein the information processing apparatus is a printing apparatus.

8. The apparatus according to claim 7, further comprising a determination unit adapted to determine whether or not a user operating the Web browser is a specific user,
wherein, in a case where the determination unit has determined that the user is the specific user, the display control unit is adapted to display the setting screen, and in a case where the determination unit has determined that the user is not the specific user, the display control unit is adapted to not display the setting screen.

9. The apparatus according to claim 8, wherein, in a case where the determination unit has determined that the user is the specific user, the control unit is adapted to enable the execution of the setting of homepage even if the setting of homepage is set as disabled.

10. The apparatus according to claim 8, wherein the specific user indicates a user having an authority of an administrator, and the display control unit is adapted to not display the setting screen in a case where the user is not the specific user.

11. The apparatus according to claim 7, further comprising an input unit adapted to input an operation for executing the setting of homepage,
wherein the control unit, in a case where the setting of homepage is set as disabled in the setting screen, is adapted to disable a user from inputting the operation through the input unit, and, in a case where the setting of homepage is set as enabled in the setting screen, is adapted to enable a user to input the operation through the input unit.

12. The apparatus according to claim 11, wherein the input unit is adapted to be displayed on the Web browser.

13. A printing method implemented by a printing apparatus, the method comprising:
a Web browser step, implemented by a Web browser, of displaying content received from an external apparatus;
a display control step, implemented by a display control unit, of displaying a setting screen for setting whether or not editing of bookmarks included in the Web browser is disabled;
a control step, implemented by a control unit, of, in a case where the editing of bookmarks is set as disabled in the setting screen, disabling an execution of the editing of bookmarks, and, in a case where the editing of bookmarks is set as enabled in the setting screen, enabling the execution of the editing of bookmarks; and a printing step, implemented by a printer, of printing content displayed by the Web browser.

14. A non-transitory computer-readable storage medium storing a computer-executable program configured to be executed at least by a computer of a printing apparatus, the program comprising:

Web browser instructions configured to be executed by a Web browser and to display content received from an external apparatus;

display control instructions configured to display a setting screen for setting whether or not editing of bookmarks included in the Web browser is disabled;

control instructions configured to, in a case where the editing of bookmarks is set as disabled in the setting screen, disable an execution of the editing of bookmarks, and, in a case where the editing of bookmarks is set as enabled in the setting screen, enable the execution of the editing of bookmarks; and printing instructions configured to be executed by a printer to print the content displayed by the Web browser.

15. A printing method implemented by a printing apparatus, the method comprising:

a Web browser step, implemented by a Web browser, of displaying content received from an external apparatus;

a display control step, implemented by a display control unit, of displaying a setting screen for setting whether or not setting of homepage is disabled;

a control step, implemented by a control unit, of, in a case where the setting of homepage is set as disabled in the setting screen, disabling an execution of the setting of homepage, and, in a case where the setting of homepage is set as enabled in the setting screen, enabling the execution of the homepage designation; and a printing step, implemented by a printer, of printing content displayed by the Web browser.

16. A non-transitory computer-readable storage medium storing a computer-executable program configured to be executed at least by a computer of a printing apparatus, the program comprising:

Web browser instructions configured to be executed by a Web browser and to display content received from an external apparatus;

display control instructions configured to display a setting screen for setting whether or not setting of homepage is disabled;

control instructions configured to, in a case where the setting of homepage is set as disabled in the setting screen, disable an execution of the setting of homepage, and, in a case where the setting of homepage is set as enabled in the setting screen, enable the execution of the homepage designation; and printing instructions configured to be executed by a printer to print the content displayed by the Web browser.

\* \* \* \* \*